US007899871B1

(12) United States Patent
Kumar et al.

(10) Patent No.: US 7,899,871 B1
(45) Date of Patent: Mar. 1, 2011

(54) METHODS AND SYSTEMS FOR E-MAIL TOPIC CLASSIFICATION

(75) Inventors: Mohan Kumar, San Jose, CA (US); Venkat Rangan, San Jose, CA (US)

(73) Assignee: Clearwell Systems, Inc., Mountain View, CA (US)

( * ) Notice: Subject to any disclaimer, the term of this patent is extended or adjusted under 35 U.S.C. 154(b) by 868 days.

(21) Appl. No.: 11/838,738

(22) Filed: Aug. 14, 2007

Related U.S. Application Data

(63) Continuation-in-part of application No. 11/657,398, filed on Jan. 23, 2007, which is a continuation of application No. 11/457,317, filed on Jul. 13, 2006, now Pat. No. 7,593,995.

(60) Provisional application No. 60/761,500, filed on Jan. 23, 2006, provisional application No. 60/761,501, filed on Jan. 23, 2006, provisional application No. 60/761,679, filed on Jan. 23, 2006.

(51) Int. Cl.
*G06F 15/16* (2006.01)

(52) U.S. Cl. .................................................. 709/206

(58) Field of Classification Search .................. 709/206; 704/4

See application file for complete search history.

(56) References Cited

U.S. PATENT DOCUMENTS 6,275,820 B1 8/2001 Navin-Chandra et al.
6,385,602 B1 5/2002 Tso et al.
6,493,663 B1 * 12/2002 Ueda ................................ 704/9
6,760,694 B2 * 7/2004 Al-Kazily et al. ................ 704/2
6,873,958 B2 * 3/2005 Artinger .......................... 705/4
6,993,535 B2 * 1/2006 Bolle et al. ........................ 1/1
7,007,067 B1 2/2006 Azvine et al.
7,185,000 B1 2/2007 Brown et al.
7,421,690 B2 9/2008 Forstall et al.
7,539,725 B2 * 5/2009 Nutkis ......................... 709/206
7,546,348 B2 * 6/2009 Wilson et al. ................ 709/206
7,593,995 B1 * 9/2009 He et al. ....................... 709/206
7,599,831 B2 * 10/2009 Ford ............................... 704/9
7,627,590 B2 * 12/2009 Boguraev et al. .................... 1/1
7,685,106 B2 * 3/2010 Brooks et al. .......... 707/999.003
7,730,081 B2 * 6/2010 Bromm et al. ................ 707/769
7,743,051 B1 * 6/2010 Kashyap et al. .............. 707/713
7,761,524 B2 * 7/2010 Carmel et al. ................ 709/206
7,765,212 B2 * 7/2010 Surendran et al. ............ 707/738
2002/0055936 A1 * 5/2002 Cheng et al. ............... 707/104.1
2002/0078158 A1 6/2002 Brown et al.
2003/0023435 A1 1/2003 Josephson
2003/0028580 A1 2/2003 Kucherawy (Continued)

OTHER PUBLICATIONS

Bernard Kerr, Thread Arcs: An Email Thread Visulization, Collaborative User Experience Group IBM Research, 2003.

(Continued)

*Primary Examiner* — Krisna Lim
(74) *Attorney, Agent, or Firm* — Kilpatrick Townsend and Stockton LLP

(57) ABSTRACT

A method for processing e-mails includes receiving a plurality of e-mails. For each e-mail in the plurality of e-mails, a feature representation is generated for an e-mail based on a set of noun phrases associated with the e-mail. A set of topics associated with the plurality of e-mails is generated based on the feature representation for each e-mail. Sentence structure associated with the e-mail and parts of speech associated with the e-mail may be determined. The parts of speech, including a set of noun phrases associated with the e-mail, may be used to generate the feature representation for the e-mail.

21 Claims, 24 Drawing Sheets

U.S. PATENT DOCUMENTS

2003/0101182 A1* 5/2003 Govrin et al. ..................... 707/7
2003/0110162 A1* 6/2003 Newman ........................... 707/3
2003/0167402 A1 9/2003 Stolfo et al.
2003/0195937 A1* 10/2003 Kircher et al. ................ 709/207
2003/0220922 A1* 11/2003 Yamamoto et al. ............... 707/7
2004/0128276 A1 7/2004 Scanlon et al.
2004/0133564 A1 7/2004 Gross et al.
2004/0220925 A1* 11/2004 Liu et al. ........................... 707/3
2004/0221295 A1 11/2004 Kawai et al.
2004/0260534 A1* 12/2004 Pak et al. .......................... 704/7
2005/0055359 A1* 3/2005 Kawai et al. .................. 707/100
2005/0097321 A1 5/2005 Zhu et al.
2005/0144245 A1* 6/2005 Lowe ............................ 709/206
2005/0154580 A1* 7/2005 Horowitz et al. ................. 704/9
2005/0223061 A1 10/2005 Auerbach et al.
2005/0228774 A1* 10/2005 Ronnewinkel .................... 707/2
2006/0031373 A1 2/2006 Werner et al.
2006/0083357 A1 4/2006 Howell et al.
2006/0083358 A1 4/2006 Fong et al.
2006/0242243 A1 10/2006 Matsumoto
2006/0248151 A1 11/2006 Belakovskiy et al.
2007/0083598 A1 4/2007 Kawakami et al.
2007/0106729 A1* 5/2007 Adams et al. ................. 709/206
2007/0157287 A1 7/2007 Lim

OTHER PUBLICATIONS

Maryam Samiei, EzMail: Using Information Visualization Techniques to Help Manage Email, School of Engineering Science Simon Fraser University, 2004.

Stephen Wan, Generating Overview Summeries of Ongoing Email Discussions, Department of Computing Macquarine University, 2004.

Yejun Wu, Indexing emails and email threads for retrieval, College on Information Studies and UMIACS University of Maryland, 2005.

* cited by examiner

METHODS AND SYSTEMS FOR E-MAIL TOPIC CLASSIFICATION

CROSS-REFERENCES TO RELATED APPLICATIONS

This application is a continuation-in-part of and claims priority to U.S. patent application Ser. No. 11/657,398, filed Jan. 23, 2007 and entitled "Methods and Systems of Electronic Message Threading and Ranking;" U.S. patent application Ser. No. 11/657,398 is a continuation of U.S. patent application Ser. No. 11/457,317 (now U.S. Pat. No. 7,593,995 issued Sep. 22, 2009), filed Jul. 13, 2006 and entitled "Methods and Systems of Electronic Message Threading and Ranking," which claims the benefit of U.S. Provisional Application No. 60/761,500, filed Jan. 23, 2006 and entitled "E-Mail Threading, Ranking, Derivation and Topic Classification Methods and Apparatus;" U.S. patent application Ser. No. 11/657,398 also claims the benefit of U.S. Provisional Application No. 60/761,501, filed Jan. 23, 2006 and entitled "Incremental E-Mail Crawling and Indexing Methods and Apparatus," and U.S. Provisional Application No. 60/761,679, filed Jan. 23, 2006 and entitled "System, Method, and User Interface for Distributed E-Mail Analysis."

The entire disclosures of U.S. patent application Ser. No. 11/657,398, U.S. patent application Ser. No. 11/457,317, U.S. Provisional Application No. 60/761,500, U.S. Provisional Application No. 60/761,501, and U.S. Provisional Application No. 60/761,679 are incorporated herein by reference for all purposes.

BACKGROUND OF THE INVENTION

Embodiments of the present invention generally relate to techniques for processing electronic messages. More particularly, the present invention relates to methods and systems for e-mail topic classification.

Collaboration using electronic messaging, such as e-mail and instant messaging, is becoming increasingly ubiquitous. Many users and organizations have transitioned to "paperless" offices, where information and documents are communicated almost exclusively using electronic messaging. As a result, users and organizations are also now expending time and money to sort and archive increasing volumes of digital documents and data.

At the same time, state and federal regulators such as the Federal Energy Regulatory Commission (FERC), the Securities and Exchange Commission (SEC), and the Food and Drug Administration (FDA) have become increasingly aggressive in enforcing regulations requiring storage, analysis, and reporting of information based on electronic messages. Additionally, criminal cases and civil litigation frequently employ electronic discovery techniques, in addition to traditional discovery methods, to discover information from electronic documents and messages.

One problem is that complying with these disclosure and/or reporting requirements is difficult because of the large amounts of electronic messages that accumulate. As broadband connections to the Internet are common in most homes and businesses, e-mails frequently include one or more multi-megabyte attachments. Moreover, these e-mails and attachments are increasingly of diverse and propriety formats, making later access to data difficult without the required software.

Another problem is that the disclosure and/or reporting requirements do not simply require that the electronic message be preserved and then disclosed. Often, the disclosure and/or reporting requirements are more focused toward information about the electronic message, such as who had access to sensitive data referred to in the contents of a particular electronic message. Some companies have teams of employees spending days and weeks reviewing e-mails in order to respond to regulatory audits and investigations. For these reasons, the inventors believe that users and organizations need electronic message analysis solutions to help lower costs in disclosing and/or reporting information related to electronic messaging.

In light of the above, there is a need for techniques for processing electronic messages that address some of the problems in the prior art.

BRIEF SUMMARY OF THE INVENTION

Embodiments of the present invention generally relate to techniques for processing electronic messages. More particularly, the present invention relates to methods and systems for e-mail topic classification.

In various embodiments, a method for processing e-mails includes receiving a plurality of e-mails. For each e-mail in a plurality of e-mails, a feature representation is generated for an e-mail based on a set of noun phrases associated with the e-mail. A set of topics associated with the plurality of e-mails is then generated based on the feature representation for each e-mail.

In some embodiments, generating the feature representation for the e-mail based on the set of noun phrases associated with the e-mail includes determining sentence structure associated with the e-mail. Parts of speech associated with the e-mail are determined, wherein the parts of speech include the set of noun phrases associated with the e-mail. In one embodiment, generating the set of topics associated with the plurality of e-mails based on the feature representation of each e-mail includes determining a centroid associated with a cluster of feature representations of one or more e-mails in the plurality of e-mails. A topic in the set of topics is determined based on the centroid.

A name associated with a topic in the set of topics may be determined based on the feature representation of one or more e-mails in the plurality of e-mails. In some embodiments, input indicative of a concept of interest is received. A topic is identified as relevant to the concept of interest. One or more e-mails in the plurality of e-mails associated with the identified topic are displayed as relevant to the concept of interest. Each topic may be ranked in the set of topics. A hierarchy may be determined between a first topic in the set of topics and a second topic in the set of topics.

In some embodiments, a computer program product includes a computer-readable medium storing a set of code modules which when executed by a processor of a computer system cause the processor to process e-mails. The computer program product includes code for receiving a plurality of e-mails, code for generating a feature representation for an e-mail based on a set of noun phrases associated with the e-mail for each e-mail in a plurality of e-mails, and code for generating a set of topics associated with the plurality of e-mails based on the feature representation for each e-mail.

In various embodiments, a system for processing e-mails includes a processor and a memory. The memory stores a set of instructions which when executed by the processor cause the processor to receive a plurality of e-mails, generate a feature representation for an e-mail based on a set of noun phrases associated with the e-mail for each e-mail in a plurality of e-mails, and generate a set of topics associated with the plurality of e-mails based on the feature representation for each e-mail.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to techniques for processing electronic messages. More particularly, the present invention relates to methods and systems for e-mail topic classification.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Processing of Electronic Messages

Figure 1:
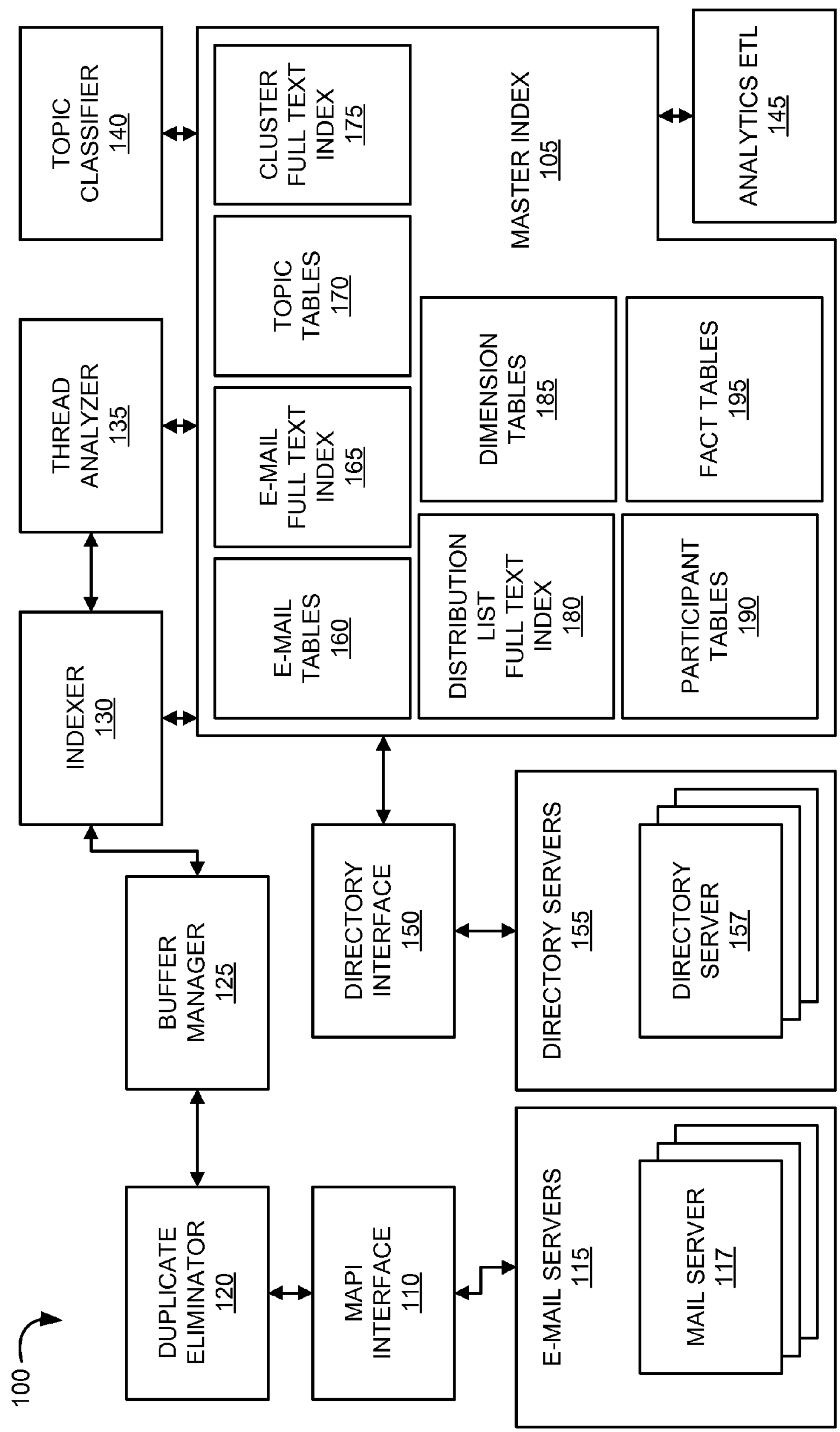
FIG. 1 is a block diagram of an electronic message processing system in one embodiment according to the present invention.

FIG. 1 is a block diagram of an electronic message processing system 100 in one embodiment according to the present invention. Electronic message processing system 100 includes master index 105, messaging applications programming interface (MAPI) module 110, e-mail servers 115, duplicate eliminator 120, buffer manager 125, indexer 130, thread analyzer 135, topic classifier 140, analytics extraction, transformation, and loading (ETL) module 145, directory interface 150, and directory servers 155. Master index 105 includes e-mail tables 160, e-mail full text index 165, topic tables 170, cluster full text index 175, distribution list full text index 180, dimension tables 185, participant tables 190, and fact tables 195. E-mail servers 115 include one or more mail servers 117. Directory servers 155 include one or more directory servers 157.

Master index 105 includes hardware and/or software elements that provide storage and retrieval of information associated with electronic messages, such as e-mail, instant messaging (IM) messages, Short Message Service (SMS) messages, Multimedia Message Service (MMS), and the like. Some examples of master index 105 are flat files, databases, data marts, data warehouses, and other repositories of data. Although the disclosure references electronic messages as e-mail messages, the disclosure should not be considered as limited to only e-mail message formats. The disclosure may also apply to other types of electronic messages, such as IM, SMS, MMC messages, and the like.

In various embodiments, e-mail tables 160 store information associated with e-mail messages processed by the system 100. E-mail full text index 165 stores an inverted index that enables fast searching of contents (e.g., headers and body), metadata, and attachments of e-mail messages processed by the system 100. Topic tables 170 store relationships between categories or topics and e-mail messages processed by the system 100. Cluster full text index 175 stores an index of e-mail messages that have a close relationship, such as relationships based on statistical analysis of noun phrases, and the like. The e-mail messages having close relationships are then associated with topics in the topic tables 170. Distribution list full text index 180 stores the full text of e-mail messages associated with a distribution or mailing list. Participant tables 190 store information related to participants of a distribution or mailing list (e.g., To-recipients, CC-recipients, BCC-recipients, etc.). Dimension tables 185 and fact tables 195 store information related to data warehouse processing of e-mail messages.

MAPI module 110 is linked to the e-mail servers 115 and to the duplicate eliminator 120. In this example, the e-mail servers 115 include one or more mail servers 117. MAPI module 110 includes hardware and/or software elements that communicate with the e-mail servers 115. E-mail servers 115 include hardware and/or software elements that provide electronic messaging services, such as e-mail transport, storage, and retrieval. One example of the mail servers 117 is a computer system running Microsoft Exchange Server 2000 from Microsoft Corporation of Redmond, Wash. In other examples, the e-mail servers 117 may include operating systems, such as Microsoft Windows 2000/XP/2003, UNIX, and Linux, and mail transport agents, mail user agents, and the like. E-mail messages may be stored on the mail servers 117 in a file, such as an Outlook PST file, and the like.

Duplicate eliminator 120 includes hardware and/or software elements that detect and eliminate redundant and/or duplicative information retrieved by the MAPI module 110. Buffer manager 125 is linked to the duplicate eliminator 120 and the indexer 130. Buffer manager 125 includes hardware and/or software elements that manage data communications between the duplicate eliminator 120 and the indexer 130.

Indexer 130 is linked to the master index 105. Indexer 130 includes hardware and/or software elements that process electronic messages to determine message content and generate metadata associated with the electronic messages. For example, the index 130 may process an e-mail message to parse header and body fields to retrieve message content and generate metadata associated with the e-mail message.

Thread analyzer 135 is linked to the indexer 130 and the master index 105. Thread analyzer 135 includes hardware and/or software elements that organize e-mail messages into one or more e-mail threads. An e-mail thread is a series or sequence of one or more e-mail messages that form a logical "discussion" or "communication." Some examples of e-mail messages within an e-mail thread are e-mail messages related by sender address, recipient address, topic, and time. Another example of e-mail messages within an e-mail thread are e-mail messages with forwarding replies, CC-recipients, BCC-recipients, and the like. In this example, the thread analyzer 135 determines the position of an e-mail message in an e-mail thread in response to message content and metadata of the e-mail message.

Topic classifier 140 is linked to the master index 105. Topic classifier 140 includes hardware and/or software elements that determine one or more topics or categories in response to e-mail message content and metadata. The topic classifier 140 may determine the topic of an e-mail message based on the subject header or in response to the content of the body of an e-mail message. The topic classifier 140 may also associate an e-mail message with a given topic, classifier, and/or category.

Analytics ETL module 145 is linked to the master index 105. Analytics ETL module 145 includes hardware and/or software elements that provide an interface accessing content and metadata processed by the system 100. In one example, the analytics ETL module 145 provides an interface for extracting data from the master index 105 and/or external data sources; an interface for transforming the data, which includes cleansing, aggregation, summarization, integration, as well as basic transformation; and an interface for loading the data into some form of data warehouse for further analysis and processing.

Directory interface 150 is linked to the master index 105 and the directory servers 155. Directory interface 150 includes hardware and/or software elements that access information stored in a directory. A directory is any database of information associated with objects, such as users or computer hosts. In various embodiments, the directory servers 155 include one or more directory servers 157 running Active Directory by Microsoft Corporation of Redmond, Wash. In other embodiments, other types of directory servers and/or services may be used such as Lightweight Directory Access Protocol (LDAP) servers, Identity Management servers, and the like. In various embodiments, examples of information stored in the directory servers 155 include "organizational" or "corporate" data, such as department identifiers associated with a user or computer host, a group identifier associated with a user, a corporate or departmental title associated with a user, telephone and address information, and security information.

In operation of the electronic message processing system 100, the MAPI module 110 retrieves e-mail messages from the e-mail servers 115 (e.g., from one of the mail servers 117). For example, the system 100 may "crawl" the e-mail servers 115 requesting e-mail messages through the MAPI module 110. The duplicate eliminator 120 filters redundant and/or duplicate e-mail messages received from the e-mail servers 115.

The indexer 130 receives the e-mail messages from the duplicate eliminator 120 through the buffer manager 125. The indexer 130 processes the e-mail messages to determine the contents of the e-mail messages and metadata associated with each e-mail message. The indexer 130 stores a full text index of the e-mail messages and the metadata in the master index 105. For example, the indexer 130 stores sender and recipient information associated with an e-mail message in the e-mail tables 160; the indexer 130 stores an inverted word list of the full text of the e-mail message in the e-mail full text index 165; etc.

The thread analyzer 135 processes the contents of the e-mail messages and the metadata in the master index 105 to organize the e-mail messages into e-mail threads. In general, the thread analyzer 135 organizes the e-mail messages into e-mail threads that form a discussion or communication of a topic or concept. One example of operation of the thread analyzer 135 is described below with respect to FIGS. 9, 10A, and 10B. The topic classifier 140 processes the contents of the e-mail messages and the metadata in the master index 105 to determine topics or categories associated with the e-mail messages. The topic classifier 140 stores the categories or topics in the topics tables 170, and stores a full text index of e-mail messages belonging to and/or associated with the same topic in the cluster full text index 175.

The directory interface 150 retrieves directory or organizational information from the directory servers 155 (e.g., from one of the directory servers 157) related to the e-mail messages. The indexer 130 or the thread analyzer 135 may use the organizational information during, processing, indexing, and/or threading of the e-mail message. In this example, the organizational data is stored in the participant tables 190 and the distribution list full text 180.

A user or computer process connects to the analytics ETL module 145 to retrieve information associated with the e-mail messages processed by the system 100. Advantageously, the electronic message processing system 100 provides a user or organization with access to e-mail messages, and other information, such as header information, message contents, message attributes, metadata, and the like, to assist in reporting requirements or gathering information for the purposes of electronic discovery. After "crawling" e-mail repositories (e.g., one of the mail servers 117) to retrieve e-mail messages, the system 100 processes and indexes the retrieved e-mail messages and stores metadata related to the processed e-mail messages in the master index 105. The system 100 allows the user or organization to search and query the processed e-mail messages and the metadata to quickly extract and process relevant information. The system 100 further provides threading and topic classification of e-mail messages to enhance the discovery and presentation of relevant information to the user or organization.

In various embodiments, after an initial crawl of a data or e-mail repository, such as the e-mail servers 115, the system 100 may incrementally process newly arriving e-mail messages on a daily bases, an hourly basis, or the like. As described above, the new e-mail messages may be incorporated into the master index 105.

Figure 2:
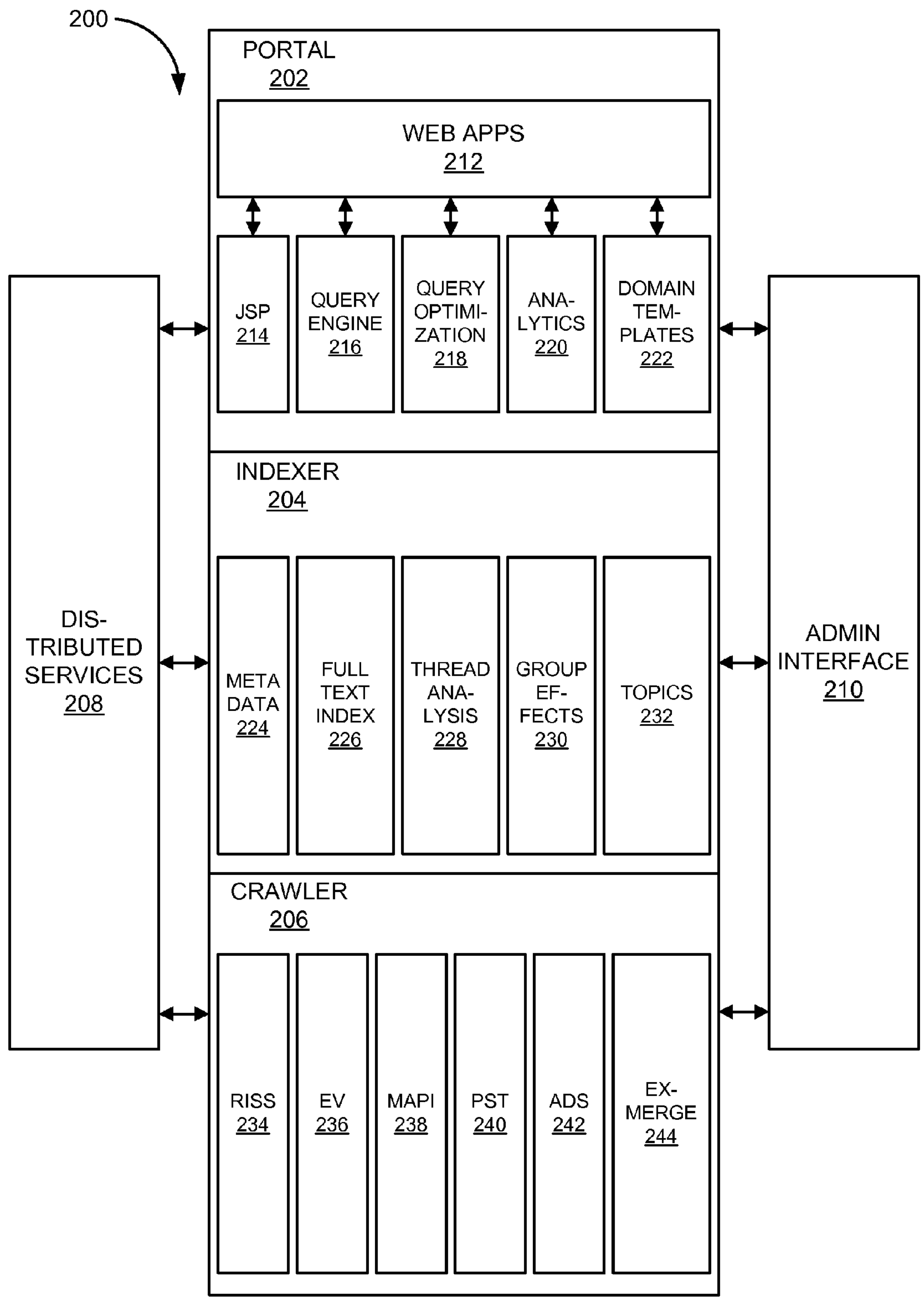
FIG. 2 is a block diagram of software components for processing electronic messages in one embodiment according to the present invention.

FIG. 2 is a block diagram of software components 200 for processing e-mail messages in one embodiment according to the present invention. Software components 200 include portal 202, indexer 204, crawler 206, distributed services 208, and administration interface 210. Portal 202 is linked to the indexer 204, which is linked to the crawler 206. Distributed services 208 and administration interface 210 are linked to each of the portal 202, the indexer 204, and the crawler 206.

Portal 202 includes software elements for accessing and presenting information provided by the indexer 204. In this example, the portal 202 includes web applications 212 communicatively coupled to information gathering and presentation resources, such as a Java Server Page (JSP) module 214, a query engine 216, a query optimization module 218, an analytics module 220, and a domain templates module 222.

Indexer 204 includes software elements for processing and storing e-mail messages. The indexer 204 includes metadata 224, full text indices 226, thread analysis 228, group effects 230, and topics 232.

Crawler 206 includes software elements for retrieving e-mail messages from an e-mail repository. Some examples of an e-mail repository are an e-mail server (e.g., one of the mail servers 117 of FIG. 1), a Post Office Protocol (POP) enabled computer server, an Internet Message Access Protocol (IMAP) enabled computer server, and files, such as PST files, UNIX style maildirs/mbox formats, and the like. In this example, the crawler 206 includes Reference Information Storage System (RISS) module 234, Enterprise Vault Software (EV) module 236, MAPI module 238, PST module 240, Directory Services (ADS) module 242, and a Microsoft Exchange Server Mailbox Merge Wizard (ExMerge) module 244.

Figure 3:
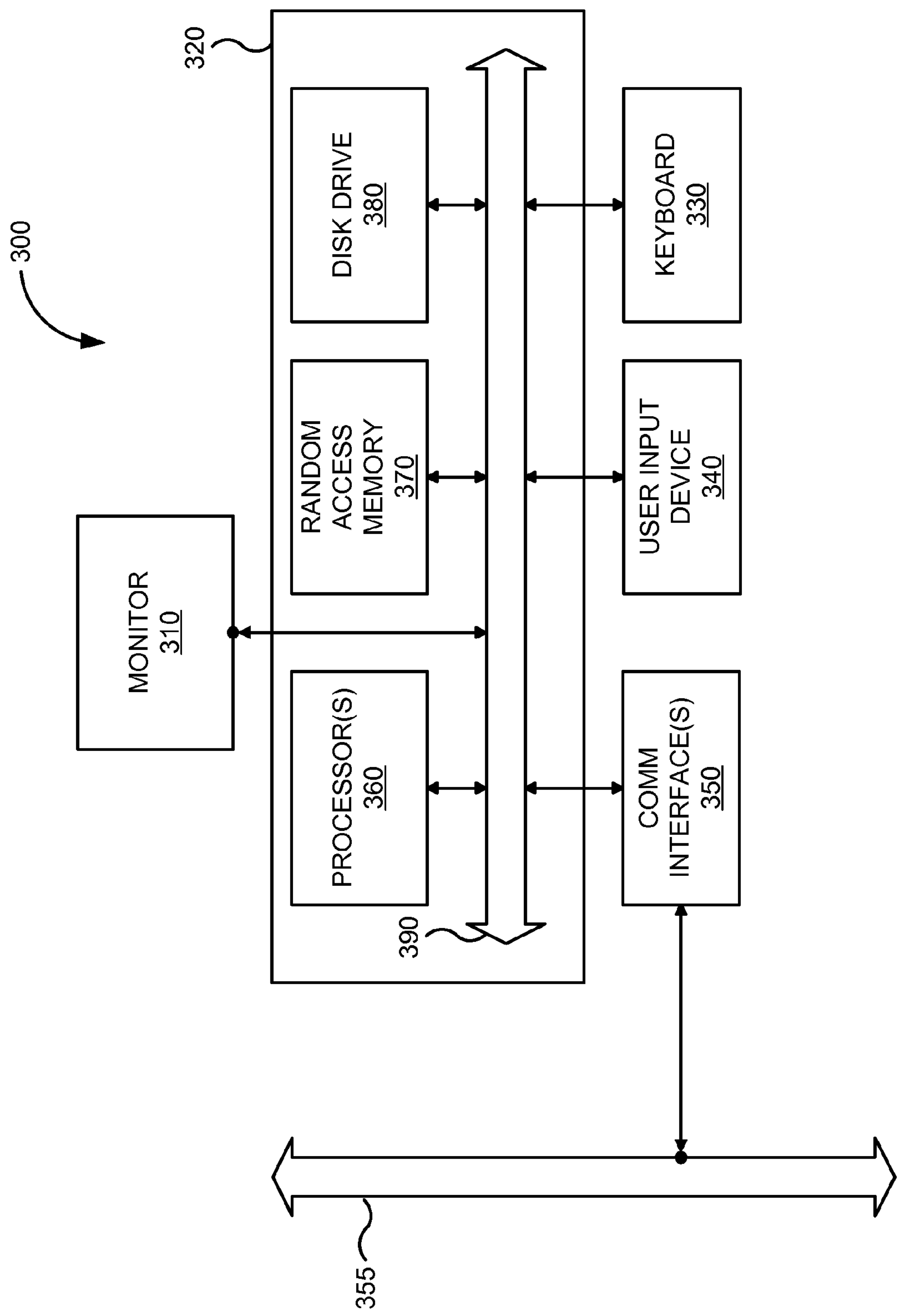
FIG. 3 is a block diagram of a computer system that may be used for processing electronic messages in one embodiment according to the present invention.

FIG. 3 is a block diagram of a computer system 300 in one embodiment according to the present invention. In this example, computer system 300 includes a monitor 310, computer 320, a keyboard 330, a user input device 340, one or more computer interfaces 350, and the like. In the present embodiment, the user input device 340 is typically embodied as a computer mouse, a trackball, a track pad, a joystick, wireless remote, drawing tablet, voice command system, eye tracking system, and the like. The user input device 340 typically allows a user to select objects, icons, text and the like that appear on the monitor 310 via a command such as a click of a button or the like.

Embodiments of the computer interfaces 350 typically include an Ethernet card, a modem (telephone, satellite, cable, ISDN), (asynchronous) digital subscriber line (DSL) unit, FireWire interface, USB interface, and the like. For example, the computer interfaces 350 may be coupled to a computer network 355, to a FireWire bus, or the like. In other embodiments, the computer interfaces 350 may be physically integrated on the motherboard of the computer 320, may be a software program, such as soft DSL, or the like.

In various embodiments, the computer 320 typically includes familiar computer components such as a processor 360, and memory storage devices, such as a random access memory (RAM) 370, disk drives 380, and system bus 390 interconnecting the above components.

The RAM 370 and disk drive 380 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 300 may also include software that enables communications over a network such as the HTTP, TCP/IP, RTP/RTSP protocols, and the like. In alternative embodiments of the present invention, other communications software and transfer protocols may also be used, for example IPX, UDP or the like.

It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

In operation, computer system 300 receives electronic messages, such as e-mail messages, from electronic messaging repositories. Computer system 300 processes an e-mail message to determine message attribute data associated with the e-mail messages. Message attribute data is information related to an attribute or content of an electronic message. Some examples of message attribute data are sender e-mail address or sender identifiers, recipient identifiers, names associated with sender/recipient identifiers, attachment data, in-line text, body content, routing information, header information, and the like. The message attribute data allows computer system 300 to provide users and organizations with access to message content, relationships between e-mail messages, topics, rankings, and the like.

Figure 4:
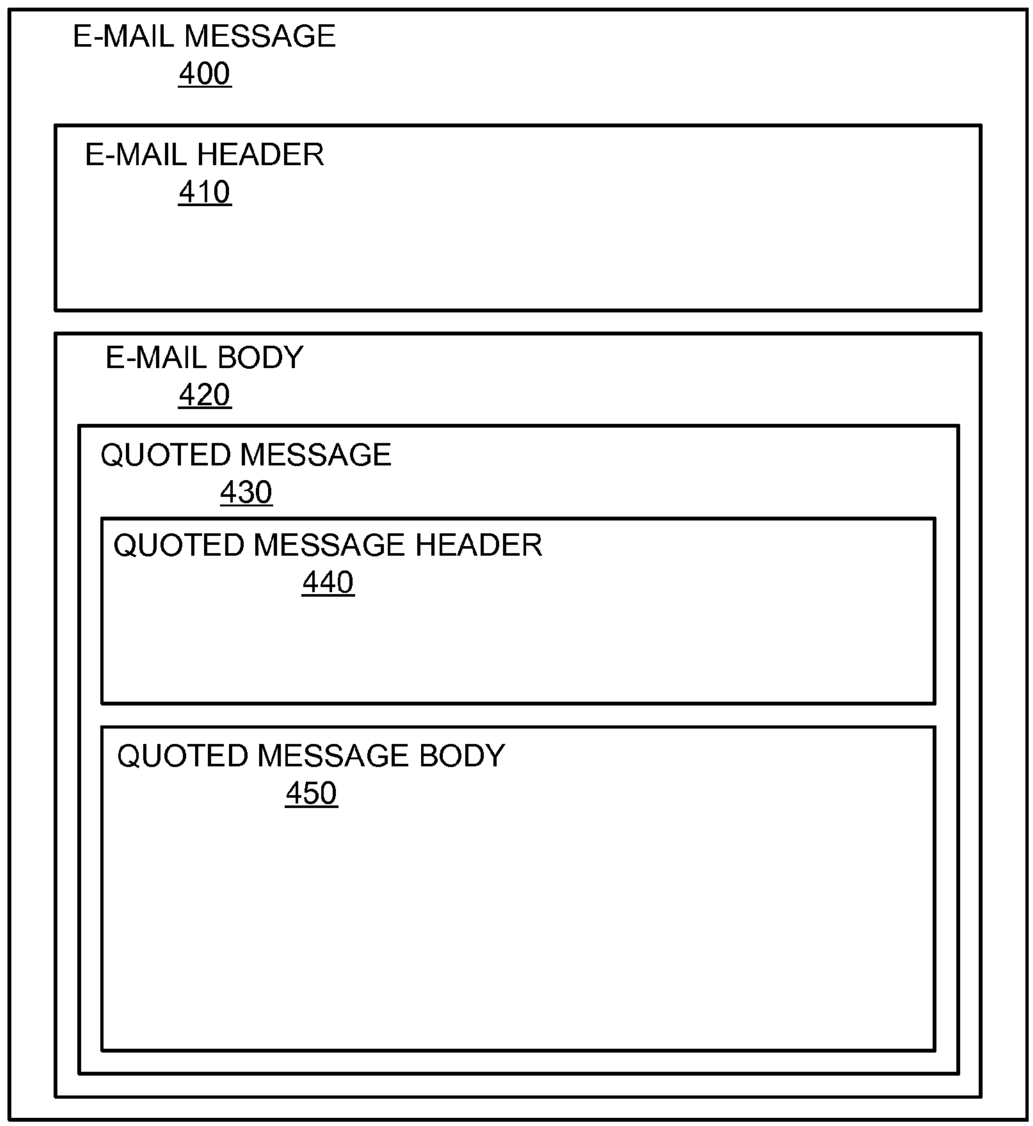
FIG. 4 is a block diagram of an exemplary e-mail message.

FIG. 4 is a block diagram of an exemplary e-mail message 400. The e-mail message 400 can be any message transmitted over a communications network, such as the Internet. In one example, the e-mail message 400 is a message communicated using one of the protocols adapted for communication using the Transport Control Protocol/Internet Protocol (TCP/IP) suite of protocols used over the Internet, such as the Simple Mail Transfer Protocol (SMTP). The e-mail message 400 may be communicated by using dedicated messaging client, such as Outlook and the like, and a web browser, such as Mozilla Firefox and Microsoft Internet Explorer and the like using a web-mail interface.

E-mail message 400 includes e-mail header 410 and e-mail body 420. In this example, e-mail header 410 generally includes message attribute data related to header information, such as routing information, spam/virus scanning information, a subject, a sender identifier (e.g., the originating or sending e-mail address), one or more recipient identifiers (e.g., To-recipients, CC-recipients, and BCC-recipients, and distribution list e-mail addresses), priority, and the like. As the e-mail message 400 travels to its destination, information about the path or network hosts through which the e-mail message 400 passed may be appended to the e-mail header 410 in the routing information.

E-mail header 410 may also contain information about the e-mail client from which the e-mail message 400 was sent. Additionally, the e-mail header 410 may include information related to the format or encoding used to communicate the e-mail body 420.

The e-mail message 400 is typically encoded in ASCII (American Standard Code for Information Interchange) text. The e-mail message 400 includes message attribute data related to portions (e.g., headers, body, etc.) of the e-mail message 400. In various embodiments, the e-mail body 420 includes non-text data, such as graphic images and sound files and the like, in-line with text and as attachments. Some examples of the contents of the e-mail body 420 are plain text, base-64 encoded text, an encoded binary file, a portion of an e-mail message, an attached Portable Document Format (PDF) file, an attached or in-line Microsoft Word document file, and the like.

In various embodiments, e-mail body 420 of the e-mail message 400 also includes a quoted message 430. The quoted message 430 itself includes quoted message header 440 and quoted message body 450. In general, quoted message 430 is a portion of an e-mail message or an entire e-mail message. Portions of e-mail messages are often included in-line with other text in the e-mail body 420. For example, the e-mail message 400 may be a reply to an initial or earlier e-mail message that is included in the e-mail body 420 as the quoted message 430. Entire or complete e-mail messages are often included in-line or as an attachment to the e-mail message 400. In other embodiments, quoted message 430 may be a forwarded messages, etc.

Quoted message header 430 comprises information, such as sender and recipient identifiers, much like the e-mail header 410. Often, the quoted message header 430 includes at least a sender identifier, one or more recipient identifiers, a subject, a timestamp, and the like. Quoted message body 450 may be plain text, html, encoded text, and the like. The quoted text body 450 also may include portions of other e-mail messages and attachments.

Figure 5:
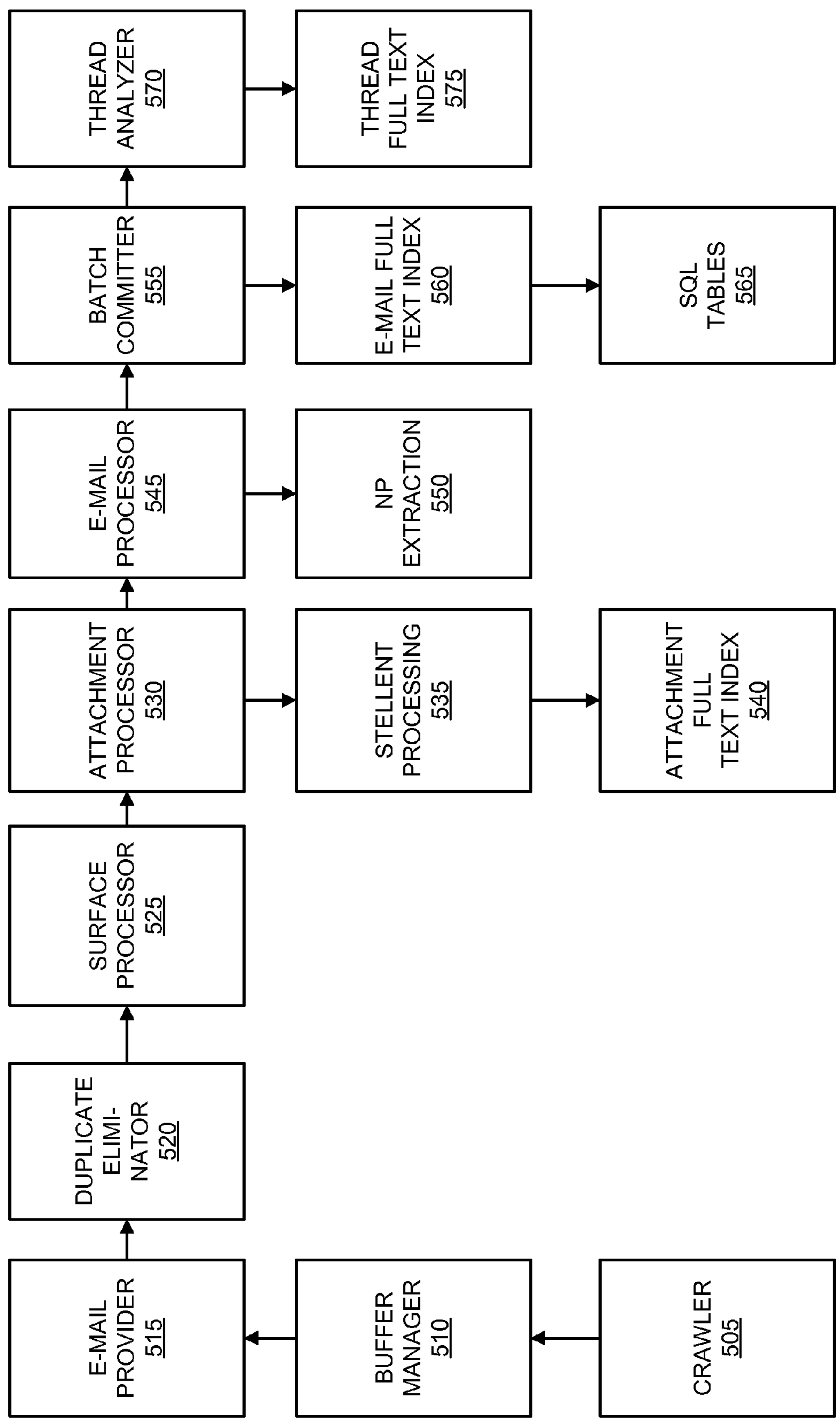
FIG. 5 is a block diagram illustrating an exemplary processing flow of e-mail messages in one embodiment according to the present invention.

FIG. 5 is a block diagram illustrating an exemplary processing flow of electronic messages in one embodiment according to the present invention. In crawler box 505, computer system 300 retrieves e-mail messages from e-mail repositories, such as an e-mail server or a file containing e-mail messages, and sends the e-mail messages to a buffer manager. In buffer manager box 510, computer system 300 buffers or otherwise manages production and consumption of the e-mail messages retrieved while computer system 300 is "crawling" the e-mail repositories. In e-mail provider box 515, computer system 300 creates batches of e-mail messages. In this example, batching the e-mail messages allows computer system 300 to apply batch-processing techniques to message attribute data associated with a batch of e-mail messages. For example, computer system 300 may create batches of 10, 50, or 100 e-mail messages.

In duplicate eliminator box 520, computer system 300 processes the e-mail messages in the e-mail message batches to determine duplicates or redundant e-mail messages. For example, a user A of the mail server 117 (FIG. 1) may have sent an e-mail message addressed to user B and to user C. When computer system 300 retrieves e-mail messages from mailboxes on the mail server 117 for users A, B, and C, user A's mailbox contains the e-mail message as sent to user B and user C. Additionally, both user B's and user C's mailbox contains the respective user's copy of the e-mail message as received from user A. In this example, computer system 300 receives possibly three copies of the e-mail message in the duplicate eliminator box 520.

Computer system 300 determines which of the three copies of the e-mail message to further process. In one example, computer system 300 determines two MD5 checksums for each e-mail message to "identify" an e-mail message. A first strict MD5 checksum is computed to be unique and represents an exact match of a previously processed e-mail message. A second "relaxed" MD5 checksum is computer to be non-unique or semi-unique.

When computer system 300 receives a new e-mail, computer system 300 processes the new e-mail message (e.g., address normalization and cleansing) and computes a strict MD5 checksum for the new e-mail message and compares the strict MD5 checksum to previously computed strict MD5 checksums to determine whether the new e-mail message is unique. In one example of operation, computer system 300 computes the strict MD5 checksum in response to message attribute data associated with an e-mail message using the sender e-mail address or sender identifier, sorted To-recipient e-mail addresses or To-recipient identifiers, sent time, alpha-numeric contents of subject, and the body text (e.g., body text size, contents of the body text, etc.).

Computer system 300 then computes a relaxed MD5 checksum using a portion of the message attribute data used to compute the strict MD5 checksum. Other information not included in the e-mail message but associated with the message attribute data may be used to compute the strict and relaxed MD5 checksums. Other types of integrity, detection, and authenticity algorithms, such as cyclical redundancy checks (CRCs), hashes, and the like, may be used in addition to or in the alternative to the MD5 checksum.

In this example, if the strict MD5 checksum for the new e-mail message is different, computer system 300 computes a relaxed MD5 checksum for the new e-mail message and compares the relaxed MD5 checksum to previously computed relaxed MD5 checksums. If the relaxed MD5 checksum for the new e-mail message is different, then the new-e-mail address is not a duplicate. If the relaxed MD5 checksum for the new e-mail message is the same as one or more previously computed relaxed MD5 checksums, computer system 300 applies rules or policies to eliminate possible duplicate e-mail messages that may occur due to time differences, header processing, and the like, and also the addition of trailing content, such as disclaimers, names of attachment files, and the like.

In surface processor box 525, computer system 300 processes the e-mail messages (e.g., to populate the master index 105 of FIG. 1 with information related to the message attribute data). Some examples of surface processing are whether text in a body of an e-mail message is text included in another e-mail message (e.g., as a response to the e-mail message), identity information of senders, and identity information of recipients. In attachment processor box 530, computer system 300 processes the e-mail message for attachments. If an e-mail message includes an attachment, computer system 300 further processes the attachment in stellent processing box 535. In this example, computer system 300 processes the attachment according to content management and searching solutions from Stellent, Inc. of Eden Prairie, Minn. In attachment full text index box 540, computer system 300 stores an inverted index of the extracted text of an attachment, if any (e.g., in the master index 105).

In e-mail processing box 545, after attachment processing or if no attachment exists in an e-mail message, computer system 300 operates on the batch of e-mail messages to parse or extract further information associated with message attribute data from the e-mail messages. In NP extraction box 550, for example, computer system 300 processes subject and body content of the e-mail messages, such as to extract noun phrases, and the like. Computer system 300 then normalizes the extracted noun phrases into a feature vector that represents topical information associated with the e-mail messages.

In batch committer box 555, computer system 300 commits the processed e-mail messages in the batch to storage. In one example, computer system 300 populates the master index 105 with information parsed or indexed in the e-mail processor box 545. In e-mail full text index box 560 of this example, computer system 300 stores a full text index of the e-mail messages (e.g., in the e-mail full text index 165 of FIG. 1). In SQL tables box 565, computer system 300 prepares Structured Query Language (SQL) tables allowing the e-mail messages and message attribute data associated with the e-mail messages in the batch to be searched using SQL statements.

In thread analyzer box 570, computer system 300 processes the e-mail messages to determine e-mail threads in response to message attribute data of the e-mail messages. In thread full text index box 575, computer system 300 stores a full text index of e-mail threads (e.g., in the master index 105). Further operations of computer system 300 in the thread analyzer box 570 are described further with respect to FIGS. 8A, 8B, 9, 10A, and 10B.

Figure 6:
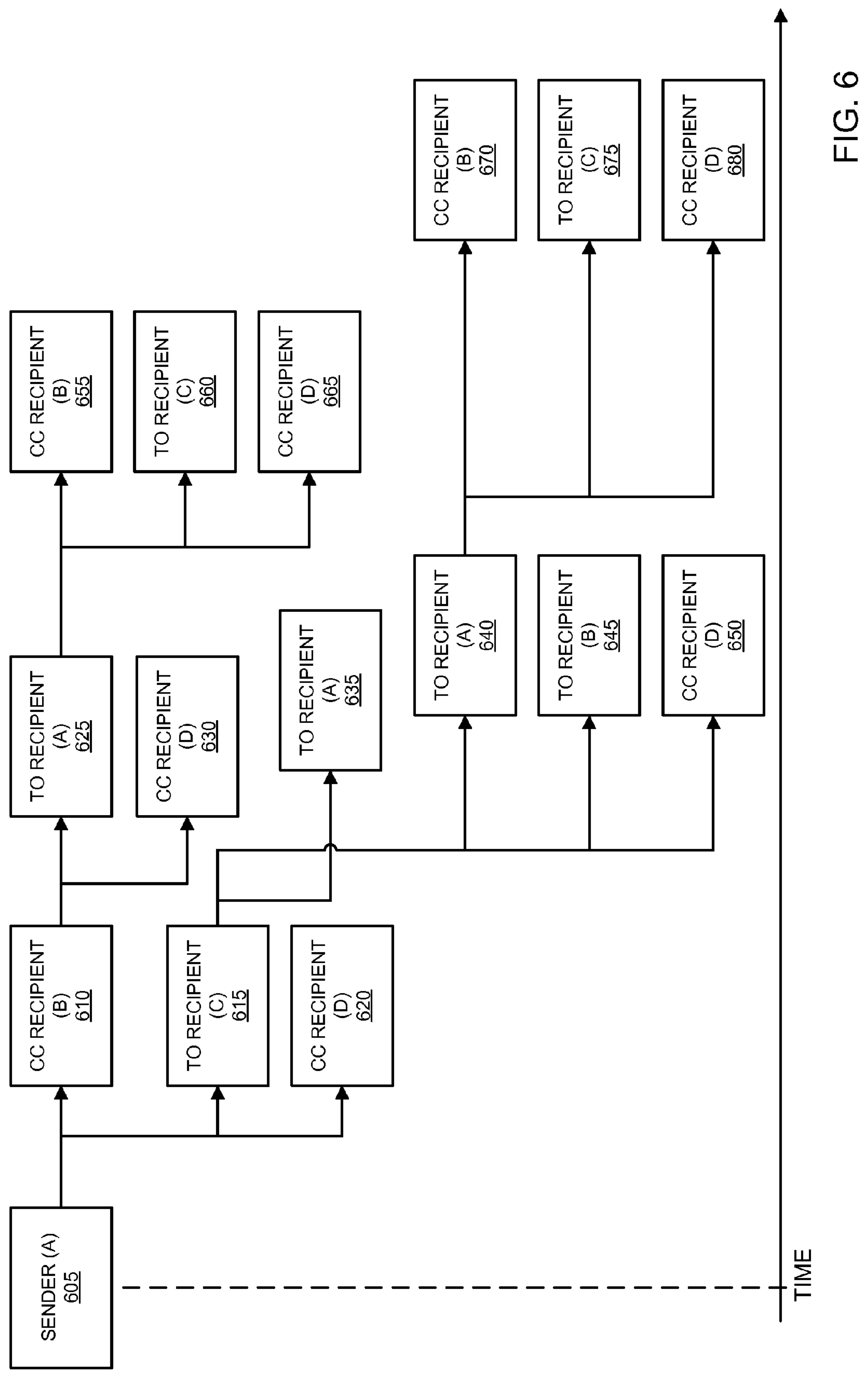
FIG. 6 is a block diagram illustrating an exemplary message sequence chart related to an e-mail thread.

FIG. 6 is a block diagram illustrating an exemplary message sequence chart related to an e-mail thread. An e-mail thread is a series or sequence of one or more e-mail messages that form a logical "discussion" or "communication." E-mail messages can be related by thread criteria, such as time, sender, topic, etc. An e-mail thread also can provide an indication of user interactions to an earlier or original e-mail message that initiated a discussion or communication formed by a series of e-mail messages. Typically, the e-mail that initiated the subsequent user interactions or communications is called a thread origin (e.g., e-mail message 605).

Referring to FIG. 6, a thread criterion defines an initial time starting indicative of when an e-mail message 605 was sent. As a result, the e-mail thread includes e-mail messages, transmitted during a time interval, that satisfy another thread criterion. In this example, computer system 300 determines e-mail messages that satisfy the thread criterion are e-mail messages related to the e-mail message 605 or otherwise transmitted in response to the e-mail message 605.

In this example, user (Sender) A composes e-mail message 605 to three users. The e-mail message 605 may be considered the origin of the e-mail thread illustrated in FIG. 6. User B receives e-mail message 610 as a carbon copy (CC) recipient. User C receives e-mail message 615 as a To-recipient. User D receives an e-mail message 620 as a CC-recipient.

In response to the e-mail message 610, the user B composes an e-message to users A and D. The user A receives e-mail message 625 as a To-recipient, and the user D receives e-mail message 630 as a CC-recipient. The user B may have forwarded or replied to the e-mail message 610 such that the e-mail messages 625 and 630 included the body text of the e-mail message 610 (in other words the original e-mail message 605). The e-mail messages 625 and 630 may also include the e-mail message 610 as an attachment, and include a similar subject as the e-mail message 610.

Next in the e-mail thread of FIG. 6, in response to the e-mail message 615, the user C composes an e-mail message to user A. The user A receives e-mail message 635 as a To-recipient. Subsequently, again in response to the e-mail message 615, the user C composes an e-mail to users A, B, and D. The user A receives e-mail message 640 as a To-recipient. The user B receives e-mail message 645 as a To-recipient. The user D receives e-mail message 650 as a CC-recipient.

After receiving the e-mail message 640, the user A composes an e-mail message to users B, C, and D in response to the e-mail message 625. The user B receives e-mail message 655 as a CC-recipient. The user C receives e-mail message 660 as a To-recipient. The user D receives e-mail message 665 as a CC-recipient.

Subsequently, in response to the e-mail message 640, the user A composes an e-mail message to users B, C, and D. The user B receives e-mail message 670 as a CC-recipient. The user C receives e-mail message 675 as a To-recipient. The user D receives e-mail message 680 as a CC-recipient.

Advantageously, computer system 300 allows a user or organization to discover information in e-mail messages that relates to discussions or communications about specific topics. Computer system 300 organizes the information, such as e-mail messages, into a thread and generates one or more topics in response to message attribute data associated with e-mail messages. Computer system 300 allows the user or organization to analyze the information to drive better business performance and/or comply with regulatory requirements.

Furthermore, computer system 300 allows the users and organizations to analyze properties of e-mail (such as recipients, replies, forwards, subject header, etc.), and combine the properties with organizational or corporate data to derive discussions and communication patterns within an organization or corporation. Computer system 300 provides access to electronic messages and message attribute data associated with the electronic messages. This allows users and organizations to quickly extract, analyze, and report information.

Derived Electronic Messages

As a result of user interactions in response to an e-mail message, subsequent e-mail messages may include quoted text from prior e-mail messages or include prior e-mail messages as attachments. Computer system 300 (FIG. 3) allows users or organizations to retrieve transactional e-mail messages from local e-mail repositories. Transactional e-mail messages are electronic messages that are received from and/or stored on an e-mail server or in a file (e.g., one of the mail servers 117 of FIG. 1). A transactional message may include quoted text or attachments.

In various embodiments, computer system 300 processes the transactional e-mail messages to determine derived e-mail messages. Derived e-mail messages are electronic messages sent by electronic messaging services, where the electronic messages are included within other electronic messages. As described with respect to FIG. 4, some examples of derived e-mail messages are quoted text in forwarded or replied to e-mail messages, and e-mail messages included as attachments. For example, a transactional e-mail message may include a derived e-mail message. A benefit provided by various embodiments is that computer system 300 allows users and organizations to capture information in derived e-mail messages that otherwise may not have been retrieved from the local e-mail repositories as transactional e-mail messages.

As the use of electronic messaging proliferates, e-mails are often received from outside of organizations that initiate discussions or communications within the organization. Computer system 300 provides the users or organizations the ability to determine from derived e-mail messages whether discussions or communication originated from outside the organization. Additionally, computer system 300 allows the users or organizations to track whether topic discussion left or went outside the organization during a series of e-mail messages and later returned to an internal discussion within the organization.

In general, a system for processing e-mail messages (e.g., computer system 300 of FIG. 3) includes a processor and a communications interface. The communications interface receives, from an e-mail repository, a transactional e-mail message comprising message attribute data. The processor is coupled to the communications interface. As described above, the processor places the transactional e-mail message in an e-mail thread in response to the message attribute data of the transaction e-mail message. The processor then determines whether there is a derived e-mail message included in the transactional e-mail message. For example, if a derived e-mail messages such as a reply or forwarded message, is included in the transactional e-mail message, the processor determines derived message attribute data of the derived e-mail message. The processor then places the derived e-mail message in the e-mail thread in response to the derived message attribute data of the derived e-mail message.

Figure 7:
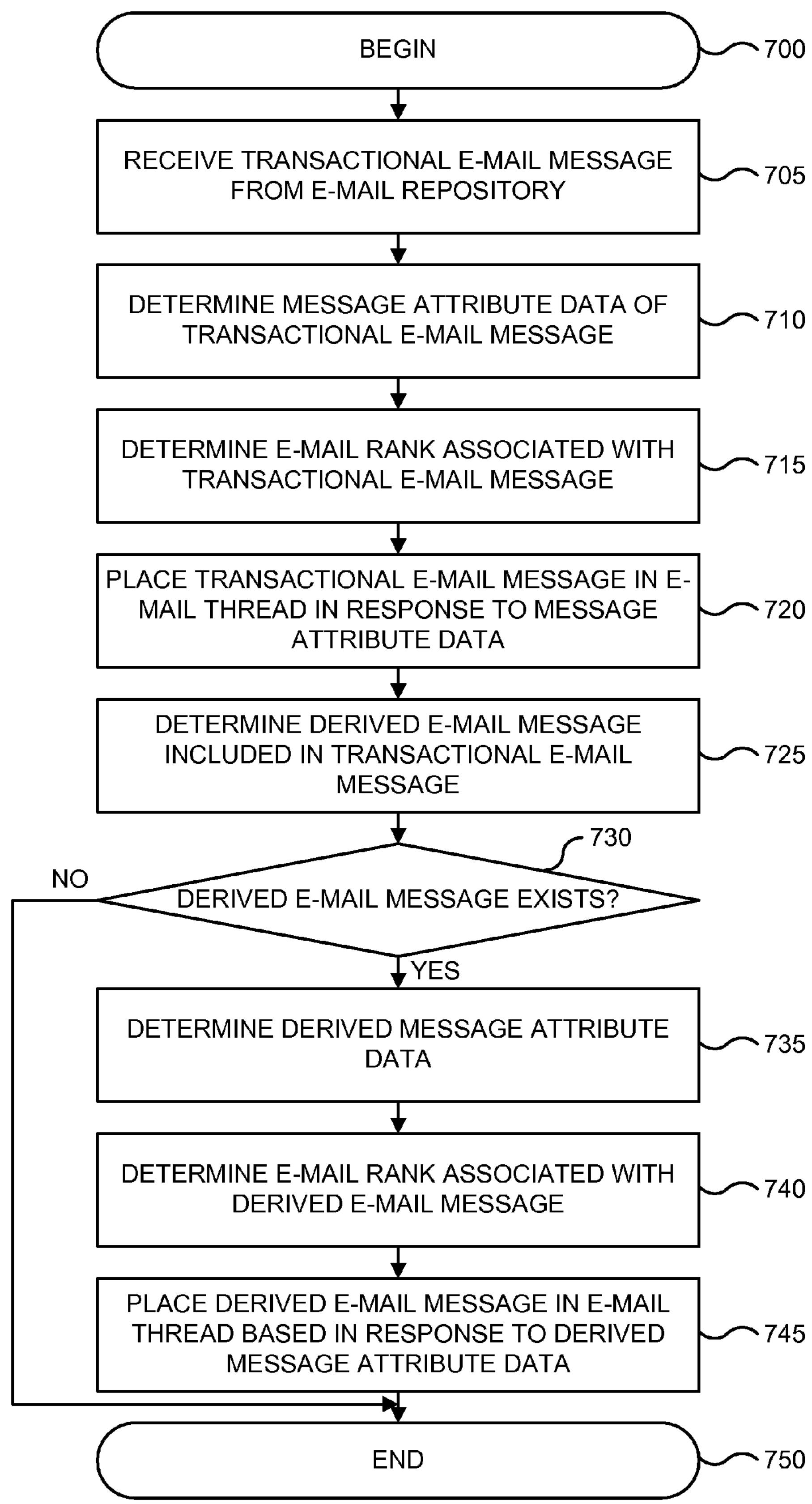
FIG. 7 is a flowchart for processing e-mail messages to determine derived e-mail messages in one embodiment according to the present invention.

FIG. 7 is a flowchart for processing e-mail messages to determine derived e-mail messages in one embodiment according to the present invention. FIG. 7 begins in step 700. In step 705, computer system 300 (FIG. 3) receives a transactional e-mail message from an e-mail repository. A transactional e-mail message is an e-mail message directly retrieved from an e-mail message repository, such as an e-mail server or an e-mail storage file (e.g., a PST file), as opposed to a derived e-mail message which generally is determined from a transactional e-mail message.

In step 710, computer system 300 determines message attribute data of the transactional e-mail message. Some examples of message attribute data are message content body, quoted text sections, attachments, signature sections, and message header information—such as a sender identifier, one or more recipient identifiers, the number of recipients, routing information, a subject line, a time stamp, and the like. In step 715, computer system 300 determines an e-mail rank associated with the transactional e-mail message. An e-mail rank is any quantitative value, symbol, or indicator associated with an e-mail message that is used to provide an indication of qualitative value, relevance, standing, degree, or position of the e-mail message.

In this example, computer system 300 determines a numerical value in response to the message attribute data for the e-mail rank associated with the transactional e-mail message. Computer system 300 may also assign the transactional e-mail message 3 or 4 stars out of 5 stars. Additionally, computer system 300 may also use external sources of information to determine the e-mail rank of e-mail messages. One exemplary method of determining an e-mail rank associated with e-mail messages is described with respect to FIGS. 8A and 8B.

In step 720, computer system 300 places the transactional e-mail message in an e-mail thread in response to the message attribute data. In step 725, computer system 300 determines whether a derived e-mail message is included in the transactional e-mail message. The derived e-mail message may be included in the transactional e-mail message as quoted text and as an attachment.

In step 730, if a derived e-mail message does not exist or is not included in the transactional e-mail message, the flowchart ends in step 750. Alternatively, if a derived e-mail message does exist or is included in the transactional e-mail message, the flowchart continues in step 735.

In step 735, computer system 300 determines derived message attribute data of the derived e-mail message. Some examples of derived message attributed data are a relationship with the transaction e-mail message (e.g., in-line, attached, forwarded, replied, etc.), derived message content body, quoted text sections, attachments, signature sections, and derived message header information—such as a sender identifier, one or more recipient identifiers, the number of recipients, routing information, a subject line, a time stamp, and the like.

In step 740, computer system 300 determines an e-mail rank associated with the derived e-mail message. In this example, computer system 300 determines the e-mail rank of the derived e-mail message in response to the derived message attribute data and the e-mail rank of the transactional e-mail message. In step 745, computer system 300 places the derived e-mail message in the e-mail thread, along with the transactional e-mail message, in response to the derived e-mail message data. FIG. 7 ends in step 750.

Ranking Electronic Messages

In various embodiments, computer system 300 processes e-mail messages (e.g., transactional e-mail messages and derived e-mail messages) to determine an e-mail rank associated with the e-mail message. A benefit provided by various embodiments is that computer system 300 allows users and organizations to sort, analyze, and process captured information in transactional and derived e-mail messages in response to e-mail ranks.

In general, a system (e.g., computer system 300 of FIG. 3) for ranking electronic messages includes a processor. The processor receives an e-mail message and determines a sender identifier associated with the e-mail message. The processor may also determine message attribute data in response to the e-mail message. The processor then determines an e-mail rank associated with the e-mail message in response to the sender identifier. The processor may determine the e-mail rank based on the message attribute data.

Figure 8A:
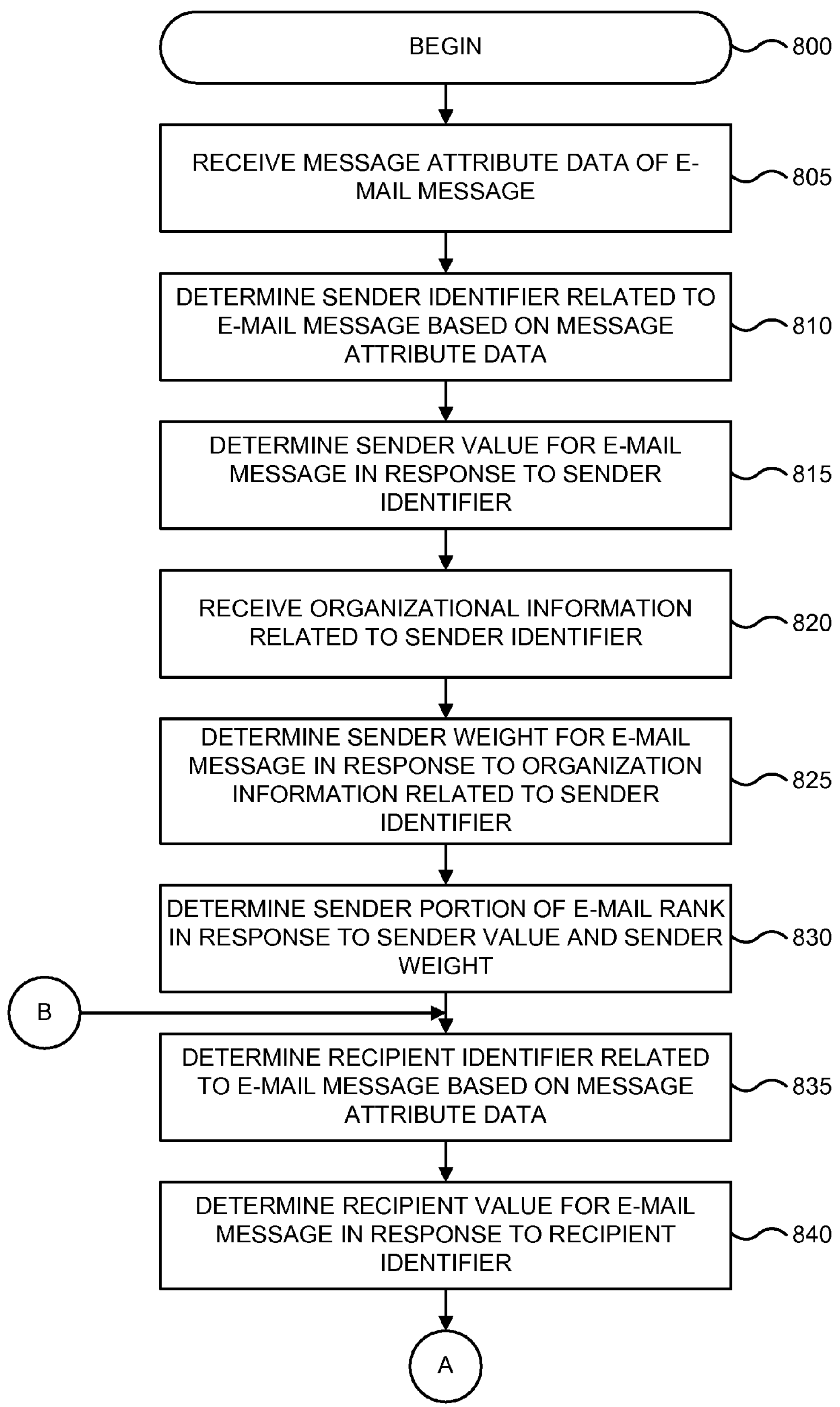
FIG. 8A and FIG. 8B are a flowchart for determining an e-mail rank associated with an e-mail message in one embodiment according to the present invention.
Figure 8B:
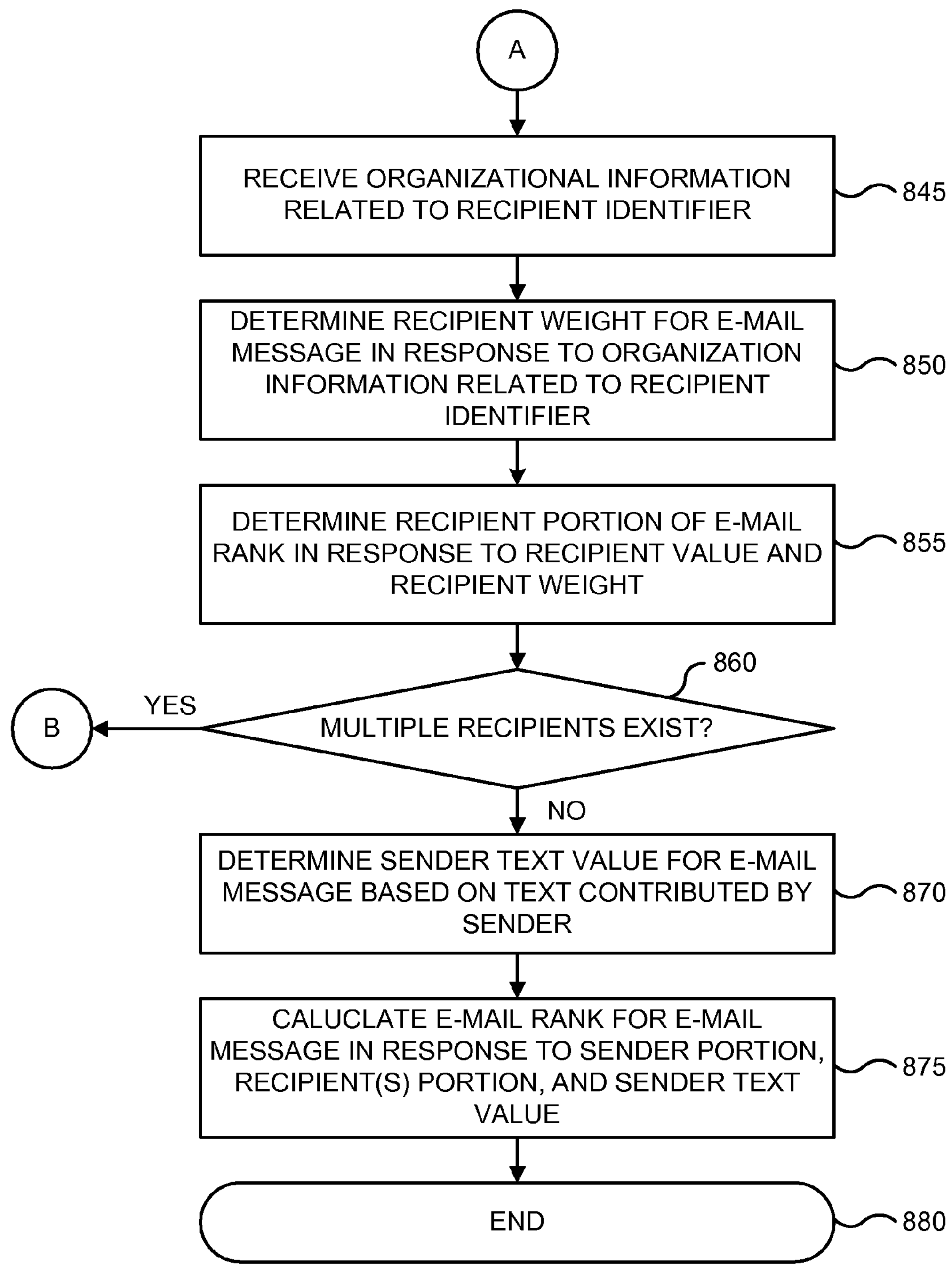

FIG. 8A and FIG. 8B are a flowchart for determining an e-mail rank associated with an e-mail message in one embodiment according to the present invention. FIG. 8A begins in step 800. In step 805, computer system 300 receives message attribute data of the e-mail message. In this example, the e-mail message can be a transactional e-mail message or a derived e-mail message.

In step 810, computer system 300 determines a sender identifier related to the e-mail message based on the message attribute data. Some examples of sender identifiers are Internet e-mail address (such as To, CC, and BCC), usernames, hostnames, last names, and first names. In step 815, computer system 300 determines a sender value for the e-mail message in response to the sender identifier.

In step 820, computer system 300 receives organizational data related to the sender identifier. For example, computer system 300 may determine that the sender identified is the CEO, CIO, CTO, President, and the like. In various embodiments, computer system 300 retrieves the organizational data from organizational or corporate directories, corporate organization charts, and the like. In step 825, computer system 300 determines a sender weight for the e-mail message in response to the organizational data related to the sender identifier. In step 830, computer system 300 determines a sender portion of the e-mail rank in response to the sender value and the sender weight.

In step 835, computer system 300 determines a recipient identifier related to the e-mail message based on the message attribute data. In step 840, computer system 300 determines a recipient value for the e-mail message in response to the recipient identifier.

Referring to FIG. 8B, in step 845, computer system 300 receives organizational data related to the recipient identifier. In step 850, computer system 300 determines a recipient weight for the e-mail message in response to the organizational data related to the recipient identifier. In step 855, computer system 300 determines a recipient portion of the e-mail rank in response to the recipient value and the recipient weight.

In step 860, if multiple recipients of the e-mail exist, the flowchart returns to step 835 to determine another recipient identifier. If no more recipient identifiers exist or recipient processing is otherwise terminated, the flowchart continues in step 870.

In step 870, computer system 300 determines a sender text value for the e-mail message based on text contributed by the sender. In one example, the entire e-mail message comprises original text contributed by the sender. In another example, the e-mail message comprises answers contributed by the sender and questions included in a previously received e-mail message. If no text is contributed, computer system 300 may determine the sender text value to be zero (0). For the more original text contributed, computer system 300 determines a larger sender text value.

In step 875, computer system 300 calculates the e-mail rank for the e-mail message in response to the sender portion, the recipient portion of one or more recipients, and the sender text value. Computer system 300 maps or otherwise associates the e-mail rank to the e-mail message. FIG. 8B ends in step 880.

In one embodiment, computer system 300 determines the e-mail message rank as a weighted average of a SenderValue, ToValue, and CCValue. For example, computer system 300 determines the e-mail rank (e.g., MessageRank) according to the following equation:

$$MessageRank = \frac{(SenderValue * SenderWeight) + (ToValue * ToWeight) + (CCValue * CCWeight)}{SenderWeight + ToWeight + CCWeight}$$

In this example, computer system 300 derives the SenderValue component using a weighted average of the sender's role (e.g., organizational role or corporate office) and the text contributed by the sender. Computer system 300 determines the value of the text contributed by the sender based on word frequency. Another example of determining e-mail rank is described in U.S. Provisional Application No. 60/761,500, filed Jan. 23, 2006 and entitled "E-Mail Threading, Ranking, Derivation and Topic Classification Methods and Apparatus."

Electronic Message Threading

In various embodiments, computer system 300 processes e-mail messages (e.g., transactional e-mail messages and derived e-mail messages) to determine "discussions" or "communications." These discussions or communications may be found in a series or sequence of e-mail messages. A benefit provided by various embodiments is that computer system 300 allows users and organizations to sort, analyze, and process captured information in transactional and derived e-mail messages into logical discussions or communications.

In general, a system (e.g., computer system 300 of FIG. 3) for threading of electronic messages includes a processor. The processor receives an e-mail message and determines message attribute data in response to the e-mail message. The processor then determines the position of the e-mail in an e-mail thread in response to the message attribute data.

Figure 9:
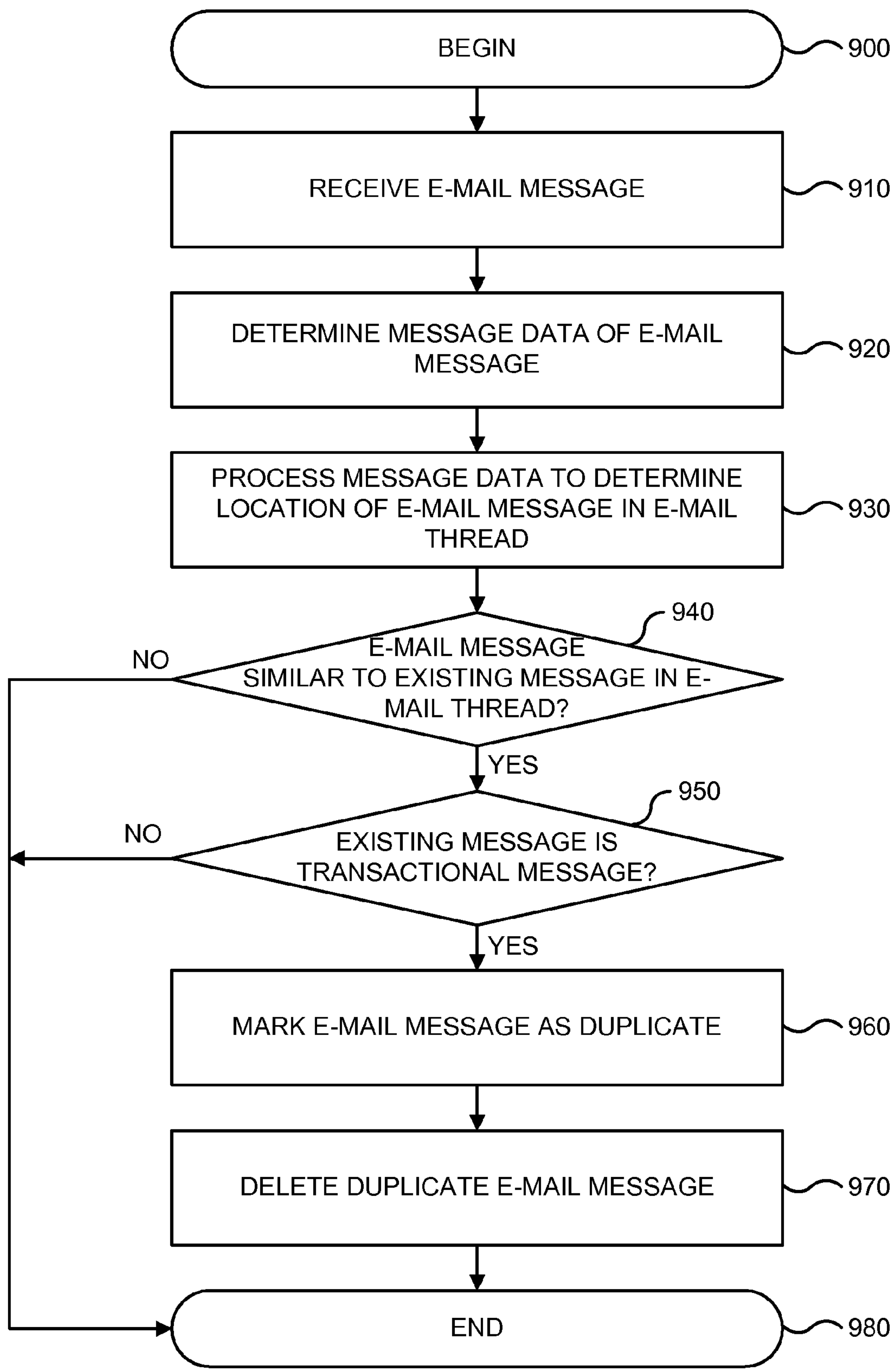
FIG. 9 is a flowchart for processing e-mail messages for placement in an e-mail thread in one embodiment according to the present invention.

FIG. 9 is a flowchart for processing e-mail messages for placement in an e-mail thread in one embodiment according to the present invention. FIG. 9 begins in step 900. In step 910, computer system 300 receives an e-mail message. In step 920, computer system 300 determines message attribute data of the e-mail message. In step 930, computer system 300 processes the message attribute data to determine a location of the e-mail message in an e-mail thread.

In step 940, computer system 300 determines whether the e-mail message is similar to an existing e-mail message in the e-mail thread. If the e-mail message is not similar to an existing e-mail message in the e-mail thread, FIG. 9 ends in step 980. Alternatively, if the e-mail message is similar to an existing e-mail message in the e-mail thread, the computer system 300 determines whether the existing e-mail message is a transactional e-mail message in step 950. In this example, computer system 300 provides deference to transactional e-mail messages, as opposed to derived e-mail messages whose message texts may have been altered during a reply or forward operation.

In step 960, computer system 300 marks the e-mail message as a duplicate. In step 970, computer system 300 deletes the duplicate e-mail message. FIG. 9 ends in step 980.

Figure 10A:
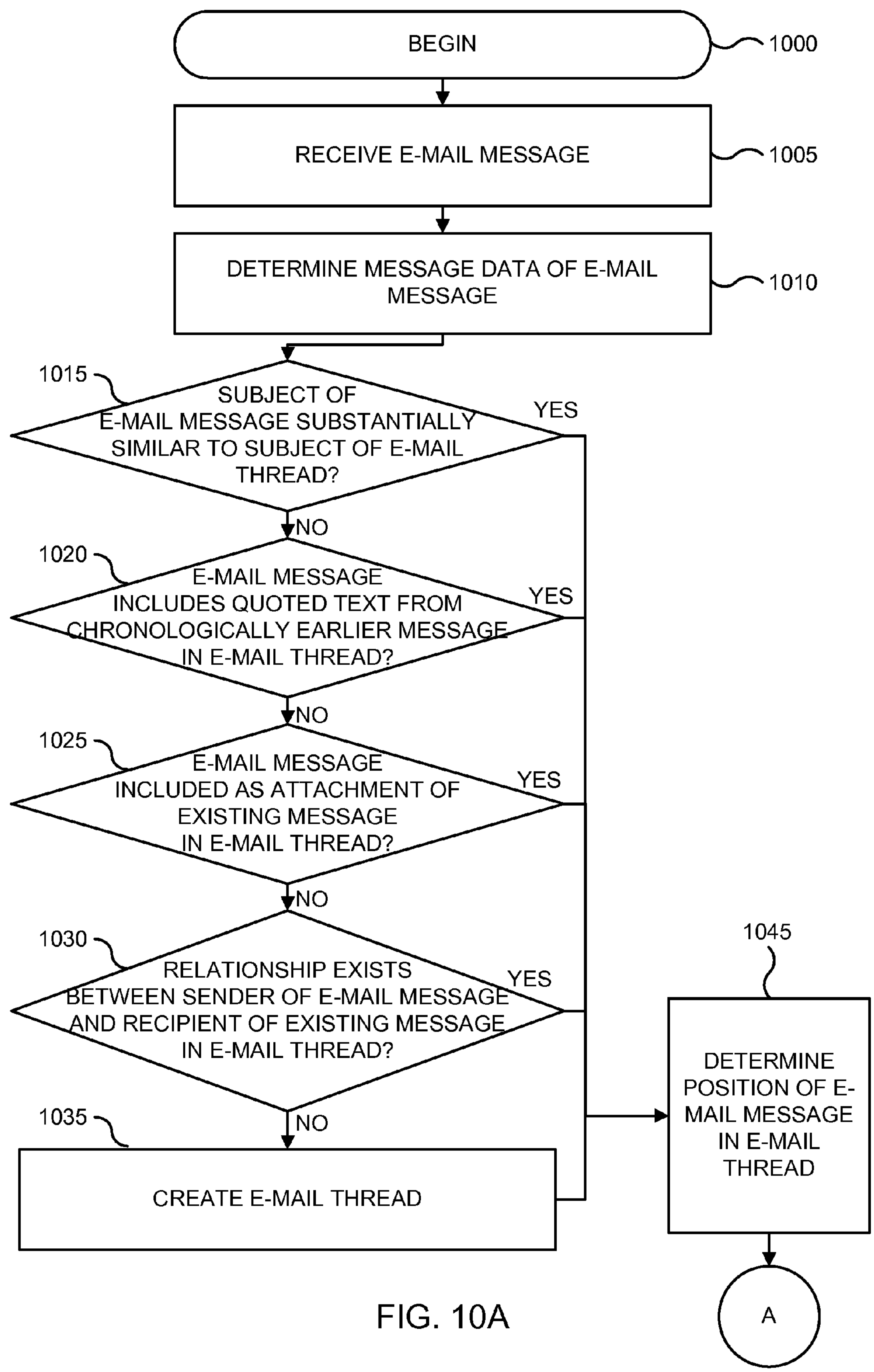
FIG. 10A and FIG. 10B are a flowchart for organizing an e-mail message in an e-mail thread in one embodiment according to the present invention.
Figure 10B:
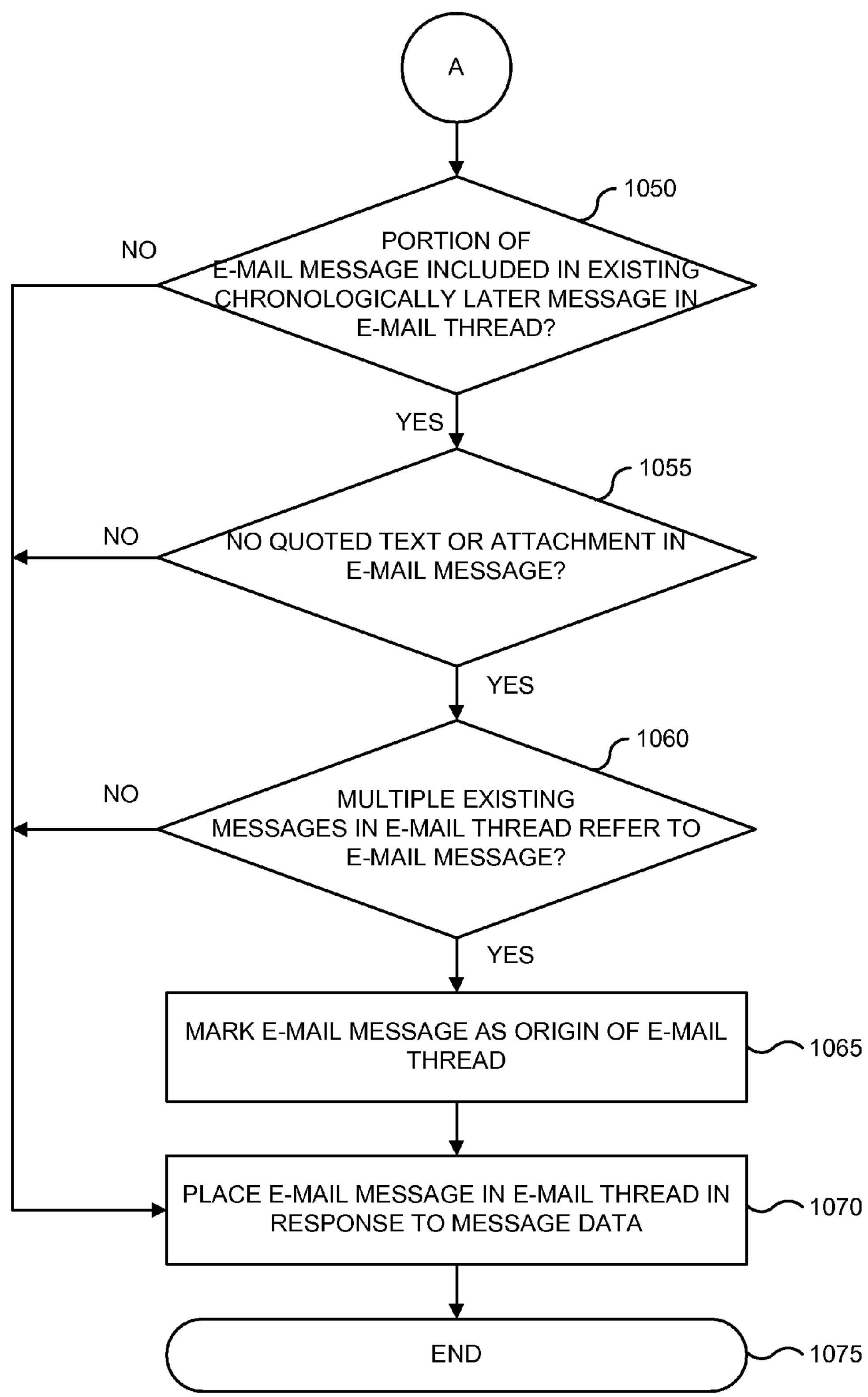

FIG. 10A and FIG. 10B are a flowchart for organizing an e-mail message, such as the e-mail message 640 from user C of FIG. 6, in an e-mail thread in one embodiment according to the present invention. FIG. 10A begins in step 1000. In step 1005, computer system 300 receives the e-mail message 640 (e.g., from one of the mail servers 117 of FIG. 1). In step 1010, computer system 300 determines message attribute data of the e-mail message 640, such as sender identifier, recipient identifier, subject, timestamps, and the like.

In step 1015, computer system 300 determines whether the subject of the e-mail message 640 (e.g., from the message attribute data) is substantially similar to the subject of an e-mail thread. If the subjects are not similar, in step 1020, computer system 300 determines whether the e-mail message 640 includes quoted text from a chronologically earlier e-mail message in the e-mail thread (e.g., text from e-mail messages 615). If the e-mail message 640 does not include quoted text, computer system 300 determines whether the e-mail message 640 is included as an attachment of an existing e-mail message in the e-mail thread (e.g., in e-mail messages 670, 675, or 680) in step 1025.

If the e-mail message 640 is not included as an attachment, in step 1030, computer system 300 determines whether a relationship exists between a sender of the e-mail message 640 and a recipient of an existing e-mail message in the e-mail thread (e.g., with the e-mail message 615, 670, 675, and 680). If computer system 300 makes a negative determination in each of the steps 1015, 1020, 1025, and 1030, computer system 300 creates a new e-mail thread with the subject of the e-mail message 640 in step 1035. If computer system 300 makes a positive determination in any of the steps 1015, 1020, 1025, and 1030, computer system 300 proceeds to determine the position of the e-mail message 640 within the corresponding e-mail thread in step 1045.

Referring to FIG. 10B, in step 1050, computer system 300 determines whether a portion of the e-mail message 640 is included in a chronologically later e-mail message in the e-mail thread, for example in the e-mail messages 670, 675, or 680. If a positive determination is made, computer system 300 determines whether there is no quoted text or attachments (such as would indicate an earlier derived e-mail message) in the e-mail message 640 in step 1055. If another positive determination is made, computer system 300 determines whether multiple existing e-mail messages in the e-mail thread refer to the e-mail message 640 in step 1060.

If computer system 300 makes a positive determination in the steps 1050, 1055, and 1060, computer system 300 marks the e-mail message 640 as an origin of the e-mail thread. In general, the origin of an e-mail thread is an e-mail message that initiated the sending of subsequent e-mail messages forming a logical discussion or conversation. Typically, the subsequent e-mail messages have similar subjects as the origin e-mail address or refer to the origin e-mail message. The subsequent e-mail messages may also include all or a portion of the original e-mail address as quoted text or as an attachment.

In step 1070, computer system 300 places the e-mail message 640 in the e-mail thread in response to the message data. If the computer system makes a negative determination in the steps 1050, 1055, and 1060, computer system 300 places the e-mail message 640 in the e-mail thread in response to the message attribute data. If the computer system makes a positive determination in the steps 1050, 1055, and 1060, computer system 300 places the e-mail message as the origin of the e-mail thread.

In this example, computer system 300 places the e-mail message 640 chronologically before the e-mail messages 670, 675, and 680. Computer system 300 identifies the relationships between the e-mail messages 640, 670, 675, and 680, such as between sender and recipient, quoted text, attachments, and the like. Computer system 300 places the e-mail message 640 chronologically after the e-mail message 615. Computer system 300 identifies the relationships between the e-mail messages 615 and 640.

In various embodiments, as computer system 300 incrementally receives e-mail messages, the e-mail message may not be received in chronological order, or any order for that matter. In response, computer system 300 may continuously "promote" or "demote" processed e-mail messages as the origin of an e-mail thread. Computer system 300 may continuously organize the e-mail thread in response to processed e-mail messages, altering relationships and updating the positions of e-mail messages in the thread in response to message attribute data of the e-mail messages. FIG. 10B ends in step 1075.

Ordering of Electronic Message Threads

In various embodiments, computer system 300 processes e-mail threads (e.g., transactional e-mail messages and derived e-mail messages) to determine an ordering associated with the e-mail threads. A benefit provided by various embodiments is that computer system 300 allows users and organizations to sort, analyze, and process captured information in transactional and derived e-mail messages into e-mail threads that may be ordered based on different criteria, such as time, topic, rank, and relevance.

In general, a system (e.g., computer system 300 of FIG. 3) for ranking electronic messages includes a processor. The processor receives a plurality of e-mail messages and determines a plurality of e-mail threads in response to the plurality of e-mail messages. The processor determines an e-mail rank associated with each e-mail message in the plurality of e-mail threads. The processor determines an e-mail rank associated with an e-mail message in response to a sender identifier related to the e-mail message.

The processor determines a thread rank for each e-mail thread in the plurality of e-mail threads. The processor determines a thread rank associated with an e-mail thread in response to e-mail ranks of each e-mail message associated with each respective e-mail thread. The processor then determines an ordering of the plurality of e-mail threads in response to the thread rank associated with each e-mail thread in the plurality of e-mail threads.

Figure 11:
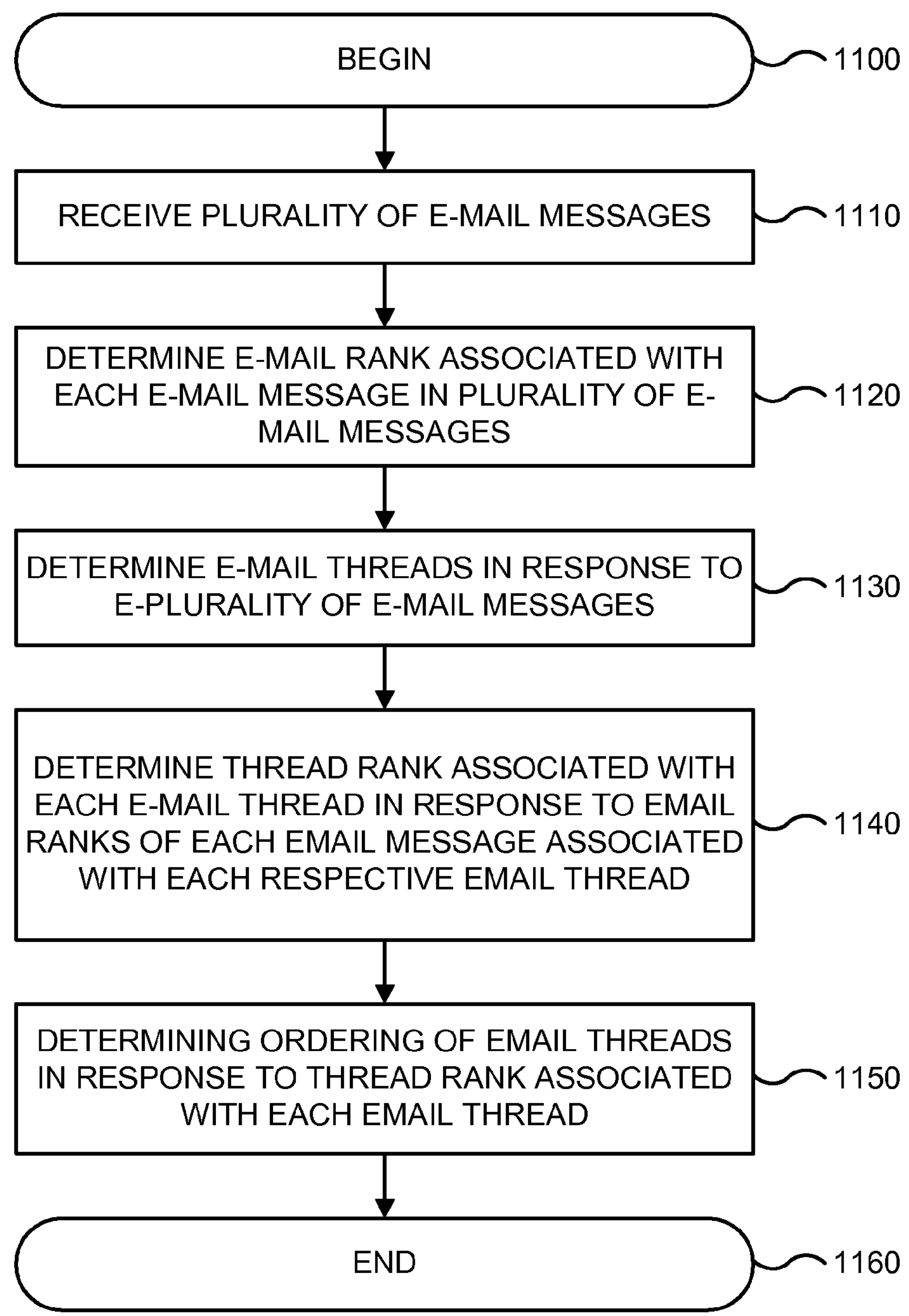
FIG. 11 is a flowchart for ordering e-mail threads in one embodiment according to the present invention.

FIG. 11 is a flowchart for ordering e-mail threads in one embodiment according to the present invention. FIG. 11 beings in step 1100. In step 1110, computer system 300 receives a plurality of e-mail messages. In step 1120, computer system 300 determines the e-mail rank associated with each e-mail message in the plurality of e-mail messages.

In step 1130, computer system 300 determines e-mail threads in response to the plurality of e-mail messages. In step 1140, computer system 300 determines a thread rank associated with each e-mail thread in response to e-mail ranks of each e-mail message associated with each respective e-mail thread. In one example, the thread rank is a weighted average of the e-mail ranks associated with the e-mail message in an e-mail thread.

In step 1150, computer system 300 determines an ordering of the e-mail threads in response to the thread ranks of each e-mail thread. Computer system 300 then may display the ordering to a user or generate a report containing the ordering. The ordering of e-mail threads allows a user or organization to determine which communications or conversations embodied in e-mail threads are most active or most relevant to a topic or other search criteria. FIG. 11 ends in step 1160.

Advantageously, computer system 300 can display the ordering of the e-mail thread to a user. For example, computer system 300 can provide the user with an ordering of e-mail threads based on a search performed for discussions or communications related to organization trade secrets. In another example, computer system 300 displays an ordering of the most active or highly discussed topics or categories in an organization.

Figure 12:
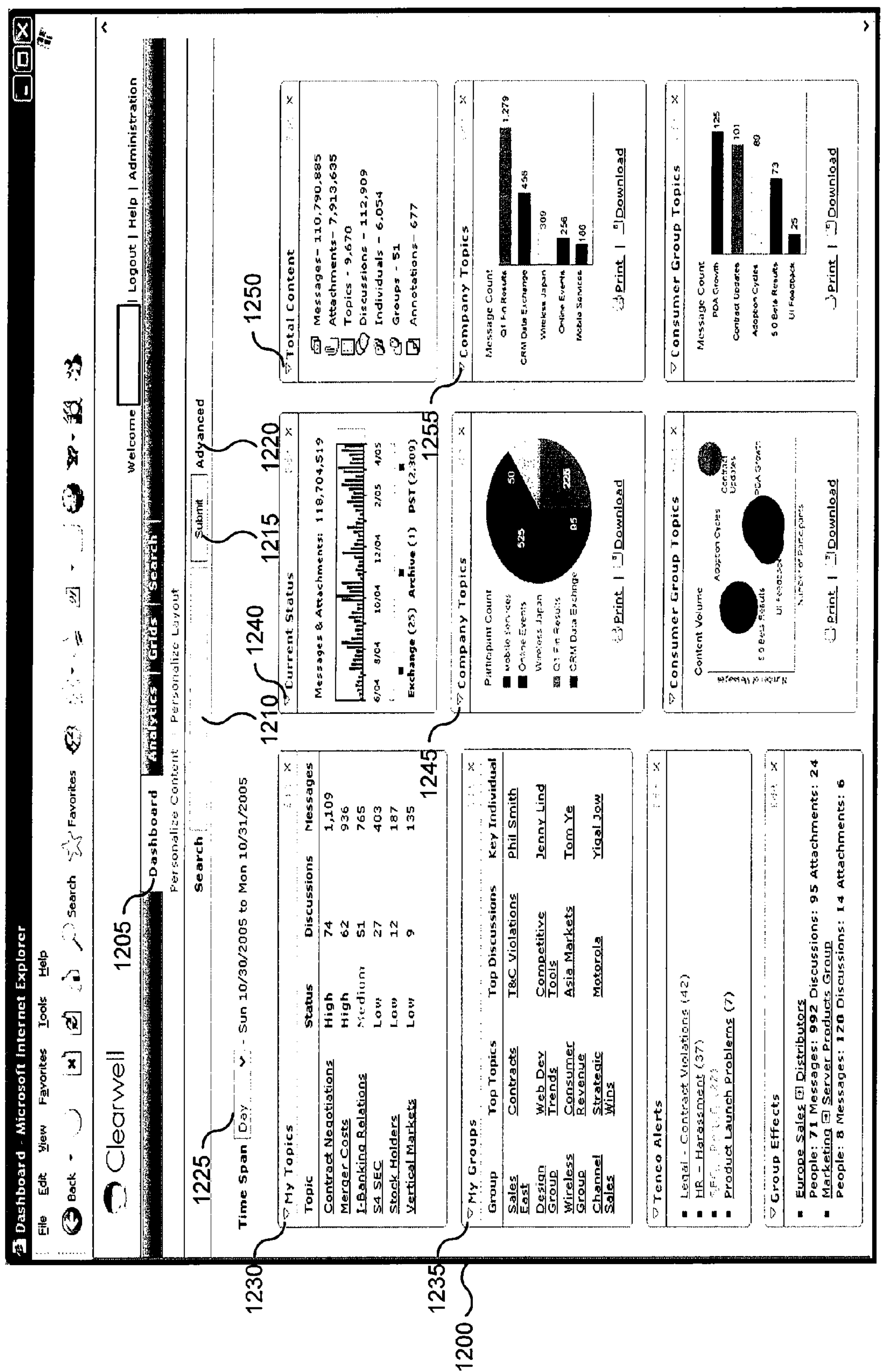
FIG. 12 is a screenshot of an exemplary dashboard displaying information related to processing of e-mail messages in one embodiment according to the present invention.

FIG. 12 is a screenshot 1200 of an exemplary dashboard 1205 displaying information related to processing of e-mail messages in one embodiment according to the present invention. The dashboard 1205 includes a search box 1210, a search submit button 1215, an advanced search button 1220, a time span interface 1225, a personalized topic display portion 1230, a group display portion 1235, a current status display portion 1240, a participants/topic display portion 1245, a total content display portion 1250, and a message/topic display portion 1255.

In this example, the search box 1210 allows a user to enter search criteria and click the search submit button 1215 to search information processed by the system 100 (FIG. 1). The user may click the advanced search button 1220 to enter a dialog (not show) provided additional search function features. The retrieved search results may be displayed in the dashboard 1205 or in a new display window. Additionally, the time span interface 1225 allows the user to enter day and time information to restrict the information displayed by the dashboard 1205.

The personalized topic display portion 1230 depicts topics of interest to the user. The topic may be arranged in the personalized topic display portion 1230 according to topic alphabetical order, topic status, the number of discussions related to a particular topic, and the number of messages related to a particular topic, as illustrated. The group display portion 1235 depicts groups in an organization and the top or most active topics, discussions, and key individuals associated with a topic, as illustrated.

The current status display portion 1240 depicts the current status of the system 100, such as the number of e-mail messages and attachments in the master index 105, and the number of messages retrieved from an e-mail server, an archive, and a PST file, as illustrated. The participants/topic display portion 1245 depicts the number of participants for a particular topic. For example, the top five topics and the number of participants associated with each of the top five topics may be displayed by a pie chart. Each topic may be displayed using a different color, as illustrated.

The total content display portion 1250 depicts the number of e-mail messages, the number of attachments, the number of topics, the number of discussions, the number of individuals, the number of groups, and the number of annotations in the master index 105, as illustrated. A unique or descriptive icon may represent each portion of the content in the master index. The message/topic display portion depicts the message count associated with a particular topic. In this example, the screenshot 1200 depicts a bar chart for the message count of five topics. In some embodiments, the dashboard 1205 includes links for printing or downloading information presented on the dashboard.

Figure 13:
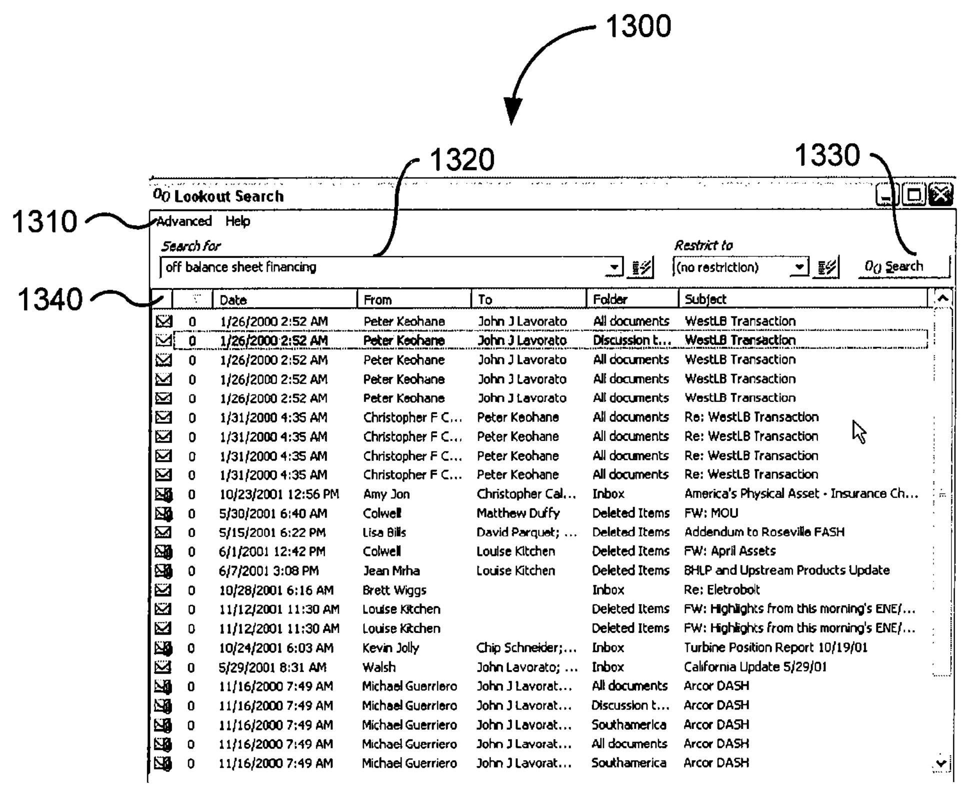
FIG. 13 is a screenshot of an exemplary search dialog displaying information related to e-mail messages in one embodiment according to the present invention.

FIG. 13 is a screenshot 1300 of an exemplary search dialog 1310 displaying information related to e-mail messages in one embodiment according to the present invention. The e-mail message search dialog 1310 includes a search box 1320, a search button 1330, and a search listing 1340. The search box 1320 allows a user to enter search terms to search information processed by the system 100. The search button 1330 submits the search terms to the e-mail processing system (e.g., the analytics ETL 116).

The search listing 1340 displays the information retrieved from the master index 105, as illustrated. In this example, the search listing 1340 displays whether an e-mail message includes an attachment, a time stamp, a sender identifier ("From"), a recipient identifier ("To"), a location or folder identifier, and a subject. In some embodiments, the search listing 1340 displays the e-mail messages sorted by a subject, a sender identifier, and/or an e-mail rank, as illustrated, as well as by other information desired by the user.

Topic Classification

In various embodiments, topic classification (e.g., topic classifier 140 of FIG. 1) provides a way to classify threads and e-mails (along with attachments) into topics (or categories of interest), to facilitate navigation, discovery, and usage of e-mail content. By classifying e-mails into topics, like e-mails may be grouped together. In some embodiments, manual specification of a taxonomy for classification is provided. Accordingly, a user or administrator may create and augment the taxonomy with auto-clustering and other techniques.

In general, a topic is a convenient way to classify e-mail and text documents. Topics represent an abstraction that represents a set of documents. These documents are viewed as a collection, sharing certain similar properties, such as semantically related subject matter and the like. Topics may be organized into a hierarchy, with parent-level topics representing a higher level conceptual organization. Flat topics are just one level grouping of documents. One property of a hierarchy is that all documents/e-mails belonging to a leaf-level (or child-level) also belong to the parent-level.

Typically, an e-mail can belong to several topics. The quoted text of an e-mail participates in the topic identification, along with the new text of the e-mail. A thread can also belong to multiple topics. Topics can also be created based on a role, using customizable topic templates. Static topic creation is a model where determining the topic to which an e-mail document belongs is done at indexing time (e.g., indexer 130 of FIG. 1). Dynamic topic creation is at query time.

In various embodiments, a topic may be created manually. Manual topic creation involves configuring a certain set of topics, along with specifying properties of each topic. Specification of these properties will depend on the manner chosen for classifying documents into topics. In some embodiments, topics are classified using auto-categorization, followed by user re-arrangement, and then by user specification of topics.

Figure 14:
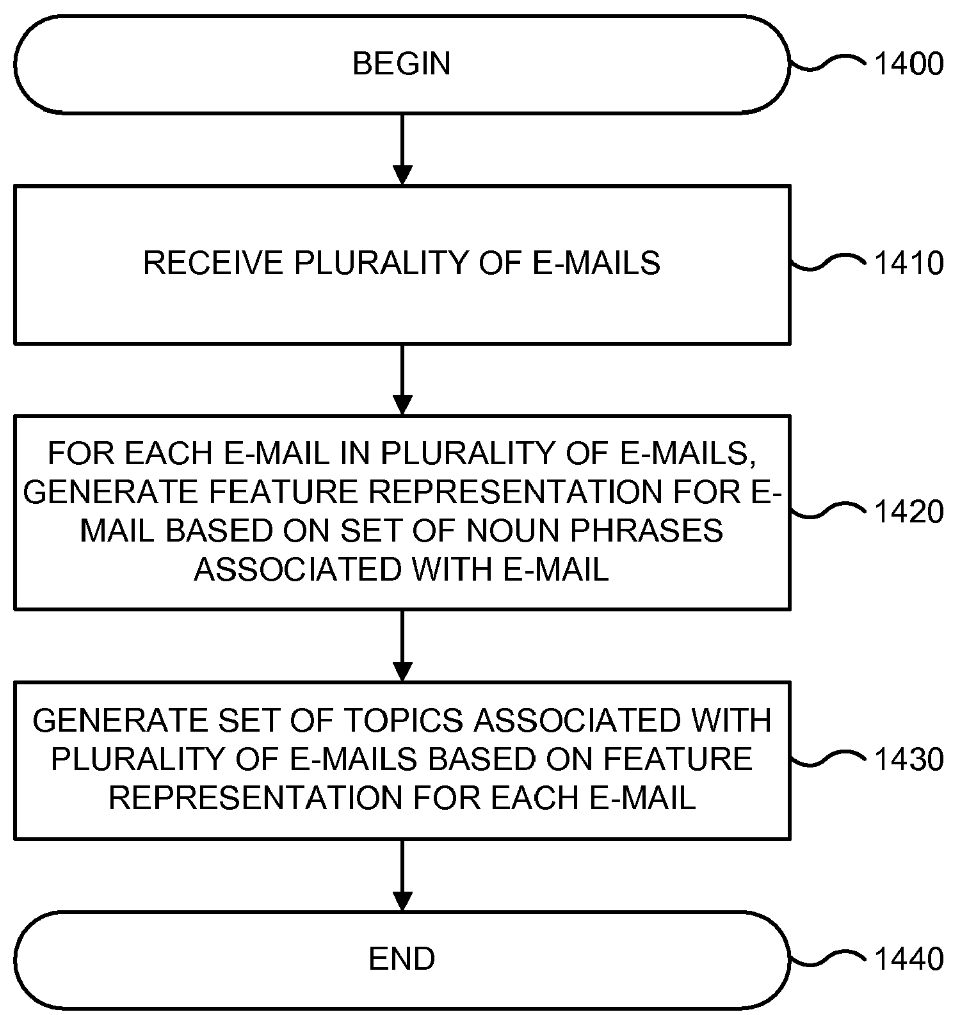
FIG. 14 is a simplified flowchart of a method for classifying e-mails into topics in one embodiment according to the present invention.

FIG. 14 is a simplified flowchart of a method for classifying e-mails into topics in one embodiment according to the present invention. The processing depicted in FIG. 14 may be performed by software modules (e.g., instructions or code) executed by a processor of a computer system, by hardware modules of the computer system, or combinations thereof. FIG. 14 begins in step 1400.

In step 1410, a plurality of e-mails is received. For example, computer system 300 may receive a plurality of e-mails from an e-mail message store, such as an Exchange Server, an IMAP server, a PST file, and the like. In step 1420, for each e-mail in the plurality of e-mails, computer system 300 generates a feature representation for an e-mail based on a set of noun phrases (NPs) associated with the e-mail. In general, a feature representation is any set, collection, fingerprint, vector, and the like that represents one or more features or properties associated an e-mail. In various embodiments, a feature representation includes a feature vector that represents a scoring of noun phrases contained in the e-mail document.

In step 1430, computer system 300 generates a set of topics associated with the plurality of e-mails based on the feature representation for each e-mail. For example, computer system 300 may determine a cluster of e-mails based on similarities in the feature representations of the e-mails. The cluster itself may represent a topic, or a concentrated portion of the cluster, or a centroid may be used to identify the topic from the cluster of common or similar noun phrases. FIG. 14 ends in step 1440.

Figure 15:
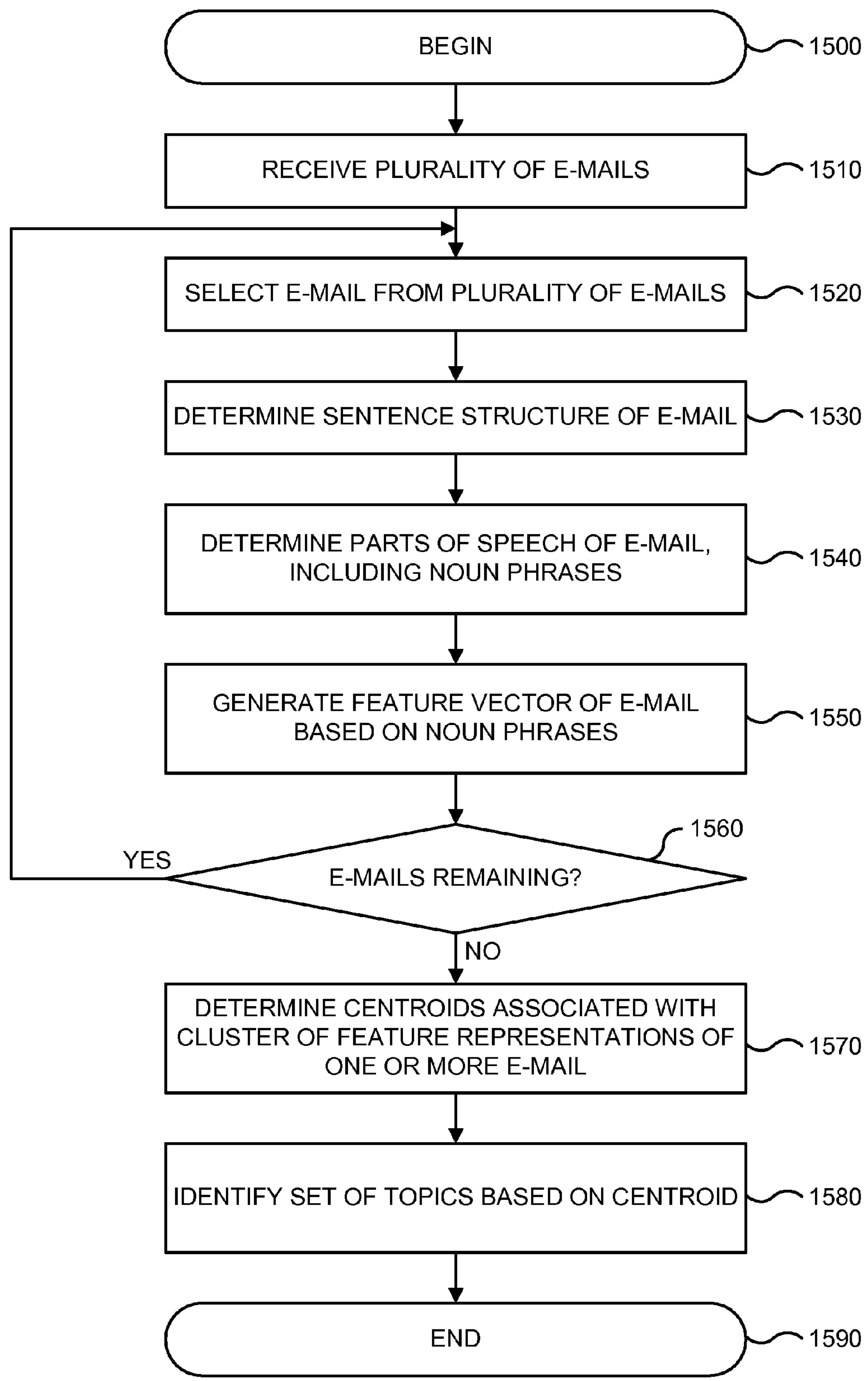
FIG. 15 is a flowchart of a method for identifying topics based on feature vectors associated with e-mails in one embodiment according to the present invention.

FIG. 15 is a flowchart of a method for identifying topics based on feature vectors associated with e-mails in one embodiment according to the present invention. The processing depicted in FIG. 15 may be performed by software modules (e.g., instructions or code) executed by a processor of a computer system, by hardware modules of the computer system, or combinations thereof. FIG. 15 begins in step 1500.

In step 1510, computer system 300 receives a plurality of e-mails. In step 1520, computer system 300 selects an e-mail from a plurality of e-mails. In step 1530, computer system 100 determines the sentence structure of the e-mail. In some embodiments, computer system 300 performs linguistic analysis to determine the sentence structure.

In step 1540, computer system 300 determines parts of speech of the e-mail, including noun phrases. For example, computer system 300 may perform linguistic and/or statistical analysis on the e-mail to decompose the e-mail into noun phrases. In step 1550, computer system 300 generates a feature vector of the e-mail based on the noun phrases.

In step 1560, computer system 300 determines whether there are any e-mails remaining in the plurality of e-mails. If there are e-mails remaining, processing continues at step 1520 where computer system 300 selects another e-mail from the plurality of e-mails.

If there are no more e-mails remaining, in step 1570, computer system 300 determines centroids associated with clusters of feature vectors of one or more e-mails. A centroid may include an entire cluster. A centroid may further include a number of similar feature vectors that satisfy or exceed a limit or threshold.

In step 1580, computer system 300 identifies a set of topics based on the centroids. For example, each centroid may represent a single topic. In some embodiments, a hierarchy of topics is determined. FIG. 15 ends in step 1590.

Figure 16:
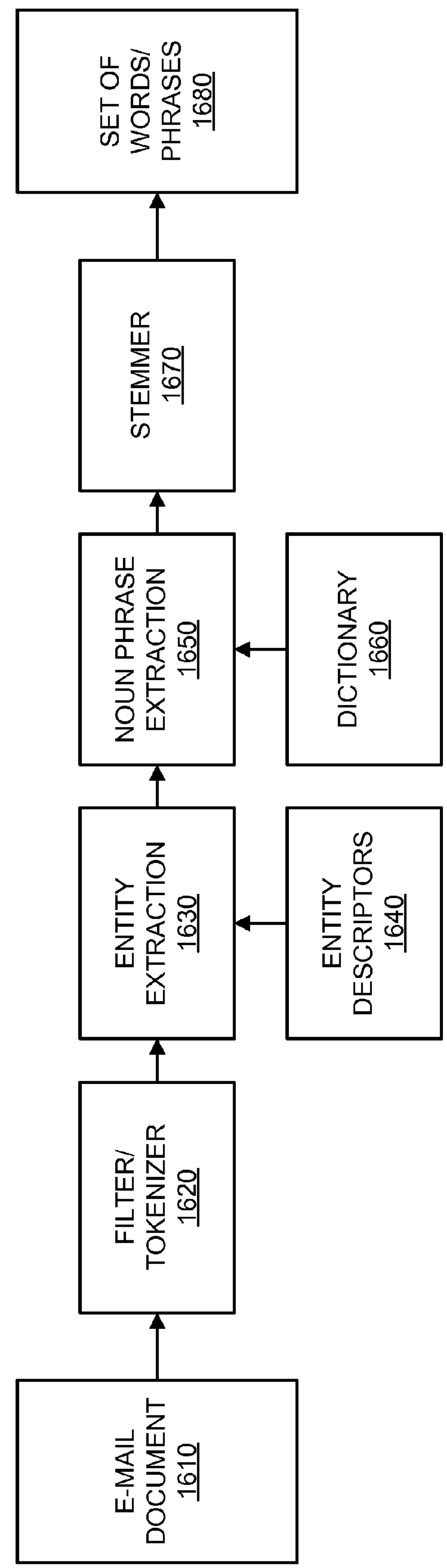
FIG. 16 is a block diagram illustrating tokenization of an e-mail in one embodiment according to the present invention.

FIG. 16 is a block diagram illustrating tokenization of an e-mail in one embodiment according to the present invention. In general, an e-mail or document is processed from a stream of bytes into a "bag-of-words" representation. The process typically contains phrase extraction, stemming, and other pre-processing.

In this example, an e-mail document 1610 first flows through a filter/tokenizer component 1620, which provides a list of tokens. Entity extraction component 1630 converts word-tokens into entities. Some examples of entities are Social Security Numbers, Phone Numbers, Contract Numbers, Normal words, and the like. Entity extraction is typically through a set of pre-programmed entity extraction rules defined in Entity descriptors component 1640. In some embodiments, a regular-expression parser may be employed to extract entities, although enterprises may have a need to express entities that are specific to their enterprise (such as contract numbers) using entity descriptors 1640.

Noun-Phrase extraction component 1650 uses the entities fed to it by entity extraction component 1630, and tags words with their noun-phases. In some embodiments, all or some of a part-of-speech may also be tagged. Dictionary 1660 provides standard phrases, grammar, spelling, and the like to determine parts-of-speech, such as noun phrases. Stemmer 1670 determines root word forms and word stems. The result of this phase of analysis is a set of words/phrases 1680 (e.g., a "Bag-of-words"), tagged appropriately.

Figure 17:
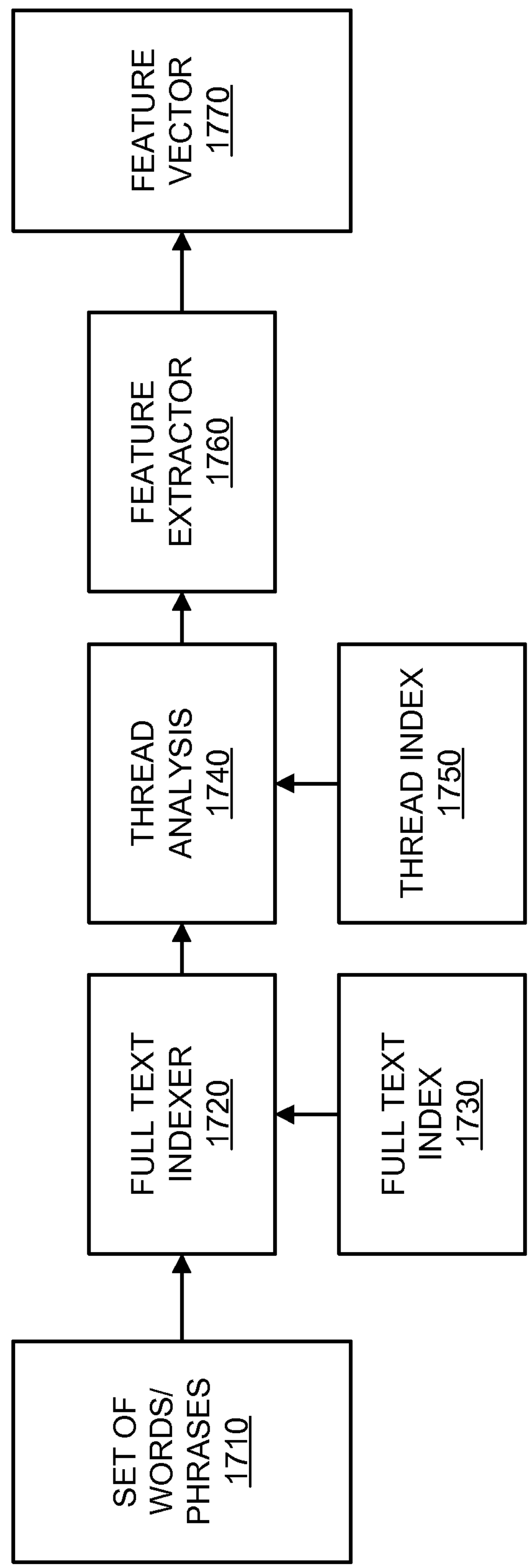
FIG. 17 is a block diagram illustrating feature vector extraction in one embodiment according to the present invention.

FIG. 17 is a block diagram illustrating feature vector extraction in one embodiment according to the present invention. In this phase of the analysis, the bag-of-words is processed, and "core features" are extracted from the e-mail or document.

The first step with the "Bag-of-words" (e.g., set of words/phrases 1710) is to perform an insertion of the e-mail document using Full-Text Indexer 1720 into the Full Text Index 1730 (e.g., E-mail Full-Text Index 165 of FIG. 1). Following this, Thread Analysis 1740 inserts the e-mail document in Thread Index 1750 (e.g., Cluster Full Text Index 175 of FIG. 1).

Feature Extractor 1760 then determines a "Feature vector" for the e-mail document. In general, Feature Extractor 1760 is responsible for deriving the appropriate "feature vector" that represents the unique characteristics of that e-mail document. A feature vector is any representation of the parts-of-speech that form a document, including noun phrases.

In various embodiments, Feature Extractor 1760 includes one or more feature vector extraction rules. Some examples of feature vector extraction rules are words with high tf-idf score, words that are marked as "important" for this role (as in role-based search), words that appear in the subject of the document, words that appear in the "New Text", words that are present in the "Quoted Text" that are in the feature vector for the original e-mail referred to in the "Quoted Text," and the like.

In some embodiments, feature vectors are extracted and scores are assigned to these entries. In one embodiment, the number of feature vector words is limited to between 10-20 entries. Each entry may be associated with a score, which is computed as follows:

$$s_{ij} = \text{Round}\left(10 * \frac{1 + \log(tf_{ij})}{1 + \log(l_j)}\right)$$

where $(tf_{ij})$ is the term frequency of term i in document j, $(l_1)$ is the length of the document j, and the term frequency is normalized by the length of the document.

Figure 18:
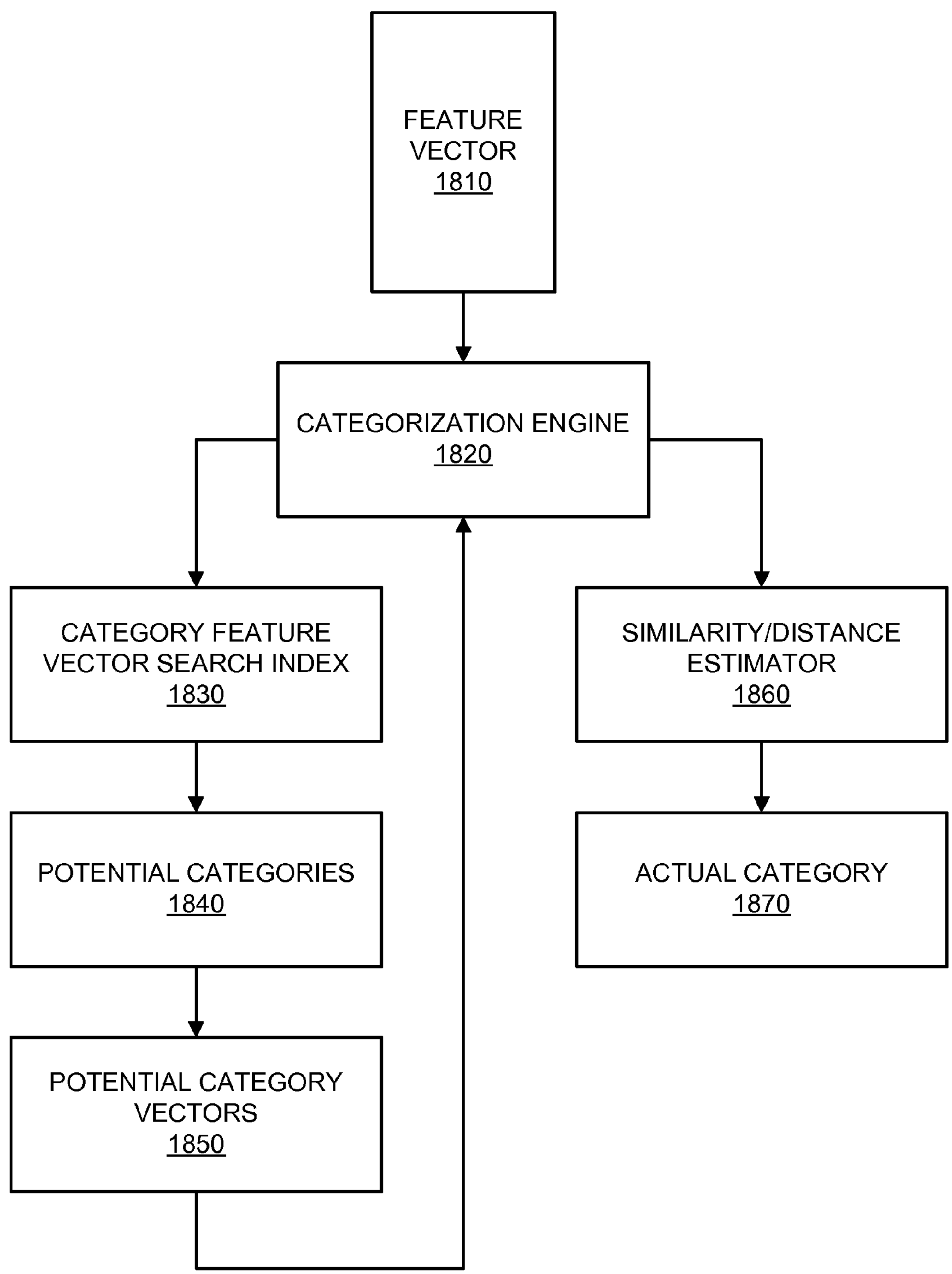
FIG. 18 is a block diagram illustrating automatic categorization in one embodiment according to the present invention.

FIG. 18 is a block diagram illustrating automatic categorization in one embodiment according to the present invention. In this example, a Feature vector 1810 for each e-mail document is input into Categorization Engine 1820. Categorization Engine 1820 then performs a search into a Category Feature Vector Search Index 1830. Category Feature Vector Search Index 1830 maps the 10-20 feature vector words of the e-mail document to a set of Potential Categories 1840.

Potential Category 1840 makes a selection based on the relevance score exceeding a certain threshold, so between 5-10 potential categories are determined. The feature vector of each category is extracted in Potential Category Vectors 1850. Similarity/Distance Estimator 1860 computes a similarity distance between the feature vector of the document and the feature vector of the category. If the similarity score is high enough, the category is assigned in Actual Category 1870 for the e-mail document. If the document does not match any category, the e-mail document is assigned as uncategorized.

Figure 19:
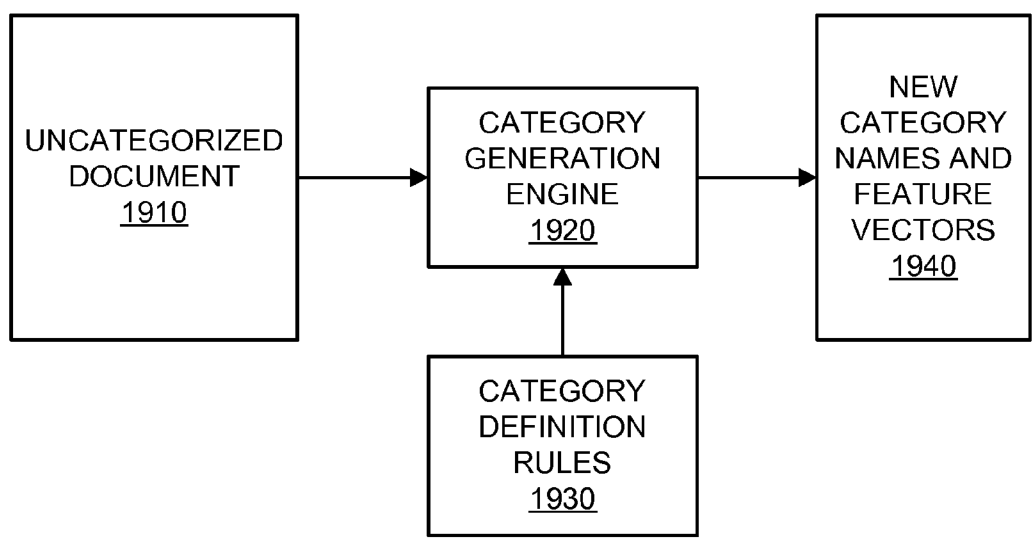
FIG. 19 is a block diagram illustrating topic creation in one embodiment according to the present invention.

FIG. 19 is a block diagram illustrating topic creation in one embodiment according to the present invention. Based on a periodic schedule, un-categorized documents 1910 may be examined to determine if it is necessary to create new categories. The feature vector of uncategorized documents is fed into Category Generation Engine 1920. Category Generation Engine 1920 uses categorization rules from Category Definition Rules 1930, and creates new categories along with feature vectors for these new categories in New Category Names and Feature Vectors 1940. Typically, each feature vector for a category is restricted to be between 20-50 words, which provides just enough words to discriminate the category from other categories. In some embodiments, scores are maintained for the feature vectors, so an ordered list of vector entries is always available.

In general, the top five entries of a feature vector should be enough to classify an e-mail document into its category. The other entries are maintained so that, when the category does not discriminate well enough causing too many documents to appear in one category, the remaining entries of the feature vector can be used to split the category into sub-categories. In some embodiments, when an e-mail document is added to a category, the category feature vector is updated, with additional scores from the e-mail document that was added. Statistics may be maintained, such as the number of documents in the category, which may be used to determine if there is a need to split the category.

In various embodiments, the merging of a new document's feature vector with the feature vector of a cluster of e-mail documents is per the following formula:

$$TF_{m,i} = TF_{s,i} + TF_{d,i} \quad (1)$$

$$DF_{m,i} = DF_{s,i} + DF_{d,i} \quad (2)$$

$$N_m=N_i+N_j+N_{ij} \quad (3)$$

$$L_m=\sqrt{N_m} \quad (4)$$

$$S_{m,i}=(k\cdot\sqrt{TF_{m,i}}+l\cdot\sqrt{DF_{m,i}})/L_m \quad (5)$$

$$FV=\mathrm{Sort}(Si)_{i=1,N_m} \quad (6)$$

In the above equations, merging feature vectors of a collection of documents with the feature vector of cluster according to equation (1) is provided where the Term Frequency (TF) of each term in the source collection (Document Feature Vector) is combined with the term in the destination (Cluster Feature Vector). In some embodiments, this combining is a weighted addition, with the weight for the new document downward-adjusted by the Document Frequency (DF) for the term.

The second step in the merge, according to equation (2), is a combination of the document frequency of the term in the destination cluster with the document frequency in the source document, $DF_{s,i}$.

The third step in the merge, according to equation (3), is to collect the total number of terms, which is the sum of the number of terms uniquely present in the Cluster Feature Vector, the number of terms uniquely present in the Document Collection, and the number of terms common to both.

The fourth step in the merge, according to equation (4), is to calculate a Feature Vector Length Normalization Factor, so that clusters with very few terms are comparable with another cluster with a larger number of terms.

The fifth step in the merge, according to equation (5), is to compute the score for a term, using the Term Frequency of a term, its Document Frequency and a combined score. This combination is weighted using two constant factors, k and l, based on the importance of term frequency and document frequency.

The final step in the merge, according to equation (6), is to sort the newly formed terms in descending order. If the new number of terms is larger than a threshold (for example, predetermined or defined as 100), the lowest ranking terms are dropped.

Statistics may be maintained, such as the number of documents in the category, which may be used to determine if there is a need to split the category.

In various embodiments, an important consideration in defining Document Clusters is the time it takes to process a very large number of documents, and the number of iterations needed for the Cluster Centroid to converge. To facilitate very fast topic classification, some embodiments employ the presence of a Full Text Engine, for fast searching capability. In particular, these embodiments take the Document Noun Phrases and build an inverted index of the following type:

[NP-1]—Document1, Document2, Document3 . . . . DocumentN

[NP-2]—Document2, Document5 . . . DocumentM

. . .

[NP-M]—DocumentX, DocumentY . . . DocumentZ

When processing a new document, a Feature Vector associated with the document is computed. Then, a search may be performed against the inverted index to identify a set of potential cluster members. These potential members are collected in a Hit Vector, and ordered based on Search Relevance Ranking, such as using the following formula.

In one example, for a collection of documents D, a specific document d, and a set of noun phrases q containing $t_i$ individual noun phrases, the score for the document may be determined according to the following:

$$s(q,d)=\sum_{t\in q}\frac{tf_{t,q}*idf_t}{norm_q}*\frac{tf_{t,d}*idf_t}{norm_d}*coord_{q,d}*weight_t$$

where $$tf_{t,X}=\sqrt{freq(t,X)}$$

$$idf_t=1+\log\frac{|D|}{freq(t,D)}$$

$$norm_d=\sqrt{|d|}$$

$$coord_{q,d}=\frac{|q\cap d|}{|q|}$$

and $$norm_q=\sqrt{\sum_{t\in q}tf_{t,q}*idf_t^2}$$

The above formulas, in this example, are based on the Apache Lucene Search Engine query evaluation provided by the Apache Software Foundation of Forest Hill, Md.

To facilitate this evaluation, in various embodiments, the ranking noun phrases are inserted from the feature vector of the document into a special Lucene Text Index region called TopicNounPhrases. Given all the documents and their Lucene regions, the above score is computed, to identify potential cluster members.

Once potential cluster members are identified, the process of determining whether they belong in a Text Cluster is based on one of the two similarity measures a) Cosine distance measurement and b) Log similarity measurement. In some embodiments, a configurable option is provided for a user or administrator of the system to select between the two measurements, based on efficacy of the topic clustering results. In general, the Cosine distance measurement produces good results, but for noun phrases that are distributed in skewed or uneven document distributions, the log similarity measurement produces better results.

Cosine Similarity Measurement

In various embodiments, for two Feature Vectors P and Q, that have Noun Phrases of frequency $TF_p$ and $TF_q$ respectively for the common noun phrases between the two vectors, the Cosine Similarity Measurement may be determined as follows:

$$S(p,q)=\frac{\sqrt{\sum_{t\in(P\cap Q)}TF_p*TF_q}}{\sqrt{\sum_{t\in P}TF_p}*\sqrt{\sum_{t\in Q}TF_q}}$$

Lot Similarity Measurement

In various embodiments, given an existing vector P and a new vector Q the log similarity measure may be determined as follows:

$$sum(p,q) = \left(\sum_{t\in(P\cap Q)} S_p * S_q\right) * \log(DF_p * DF_q)$$

$$L(p,q) = \frac{(e^{sum(p,q)} - 1)}{(e^{sum(p,q)} + 1)} * \left(\frac{\sum_{t\in(P\cap Q)} TF_t}{\sum_{t\in Q} TF_t}\right)$$

In the above equations, the values $S_p$ and $S_q$ are scores for the common terms between the two vectors P and Q. The values $DF_p$ and $DF_q$ represent the document frequency of the term, whose log value is used to normalize the sum of the scores. After these are computed, the exponential ratio term is further normalized by the ratio of the sum of the $TF_t$ the term frequency of common terms to a similar sum of the $TF_t$.

When a category reaches a certain critical mass (e.g., in terms of number of documents, or in terms of its feature vector composition), the category may be split into multiple categories. As this occurs, a parent category may also be created. The parent category's feature vector may be derived from the common feature vectors from all the children's feature vectors. It is possible for some of the e-mail documents to only match a Parent Category and not any of the Children Categories. This Category Hierarchy Generation may be an infrequently scheduled task—perhaps once every million e-mail documents indexed, or once every week, etc.

In various embodiments, a default naming policy is provided to name a category. This can be renamed later by an administrator or user. In general, the default naming policy takes one or two category feature vector words with the highest scores, and uses those words as the name for the category.

In some embodiments, manual topic/category creation and integration are based on users defining topics using certain terms. A graphical user interface (GUI) for manual topic generation may include a dialog box with fields for entering the name of a topic, a set of terms/words representing the topic, a topic category, and the like. When topics are defined, the definition is maintained in a database table, such as shown below:

| TopicId | UserId | TopicName | Type | TypeValue | Score | Last Modified |
|---|---|---|---|---|---|---|
| 1 | <user-name> | Apple | NP | iPod | 10 | |
| 1 | <user-name> | Apple | NP | Steve Jobs | 9 | |
| 2 | <user-name> | AppleFruit | Query | "fruit and apple" | 10 | |

Typically, topic definitions may be edited through the GUI such as using add/modify/delete operations. In one embodiment, topic definitions may be maintained on a per-user level. Upon completion of an add/modify/delete event associated with the GUI, an evaluation of the changes occurs which results in one or more of the following assessments. The GUI change is a cosmetic change such as the name of the topic. Such a change results in the topic name changing, without a re-classification. The GUI change has a topic classification change and is inconsistent with existing topics that are already defined. The GUI change has a topic classification change and needs to result in a re-classification of documents. Thus, a range of e-mail documents may be re-classified per the current topic definition. Typically, to perform this re-classification, the e-mails document is not re-crawled. Instead, the e-mail document's noun phrases (NPs) are stored, and are used for applying the queries.

After the GUI has set up all topics, a "Done with all topics" GUI action invokes an indexer thread that is responsible for querying a topic configuration database for all new topic configurations; building a new Query-Net (if query based topic definition is part of the feature set); building a new NP Full-Text Index that contains the NPs of all the new topic definitions; searching these NPs from the Doc-NPs to identify all documents with a hit (this query may be limited to a time range); iterating through the docs from the above hit list and ensuring that the doc matches the selection criteria and applying the topic index; ensuring that, if a document belongs to multiple topics, all topics are properly identified; creating a score for the document; capturing the [document, topic, score] for ranking the topics of a document; updating topic statistics for the topic; updating global indexer statistics; and persisting the document-to-topic map and topic-to-document map; etc.

In various embodiments, to enable integration of manual topics and to allow for post-crawl re-classification, topic creation may be performed in two phases. In phase 1, all the NPs and entities are extracted from e-mail documents and stored in a Full-Text Index similar to the Cluster-FTI (e.g., Cluster Full-Text Index 175 of FIG. 1). In phase 2, all the Cluster-FTI documents are processed, running through and applying the Cluster rules (either manual or auto).

The first stage data flow is primarily concerned with identification of subject and body regions of an e-mail document, and creation of noun phrases (NPs) from these regions. These NPs are added to the Topic Full-Text index and the E-mail Full-Text index. The topic classification first stage is invoked in the context of the e-mail processing (e.g., indexer 130 of FIG. 1), after completing the surface analysis, and preliminary e-mail Full-Text processing. Thread Analysis is not yet completed at this point. The subject and body regions are then reprocessed, and a Token Reader is added to the Topic Full-Text index. Topic Full-Text index stores the noun phrases as a searchable region for each document. In various embodiments, a text feature vector is constructed and stored in the E-mail Full-Text index.

The second stage of topic classification takes the results from the first stage and generates categories, as well as assigns e-mail documents to topics. In one embodiment, topic classification gives preference to manual topics, on the assumption that user-defined topics have a higher degree of fidelity to topic definitions. As part of the initial setup, manual topics are processed into a text feature vector for the topic. The text feature vectors are then populated or indexed into a Cluster Full-Text index (e.g., Cluster Full-Text index 175 of FIG. 1).

Figure 20:
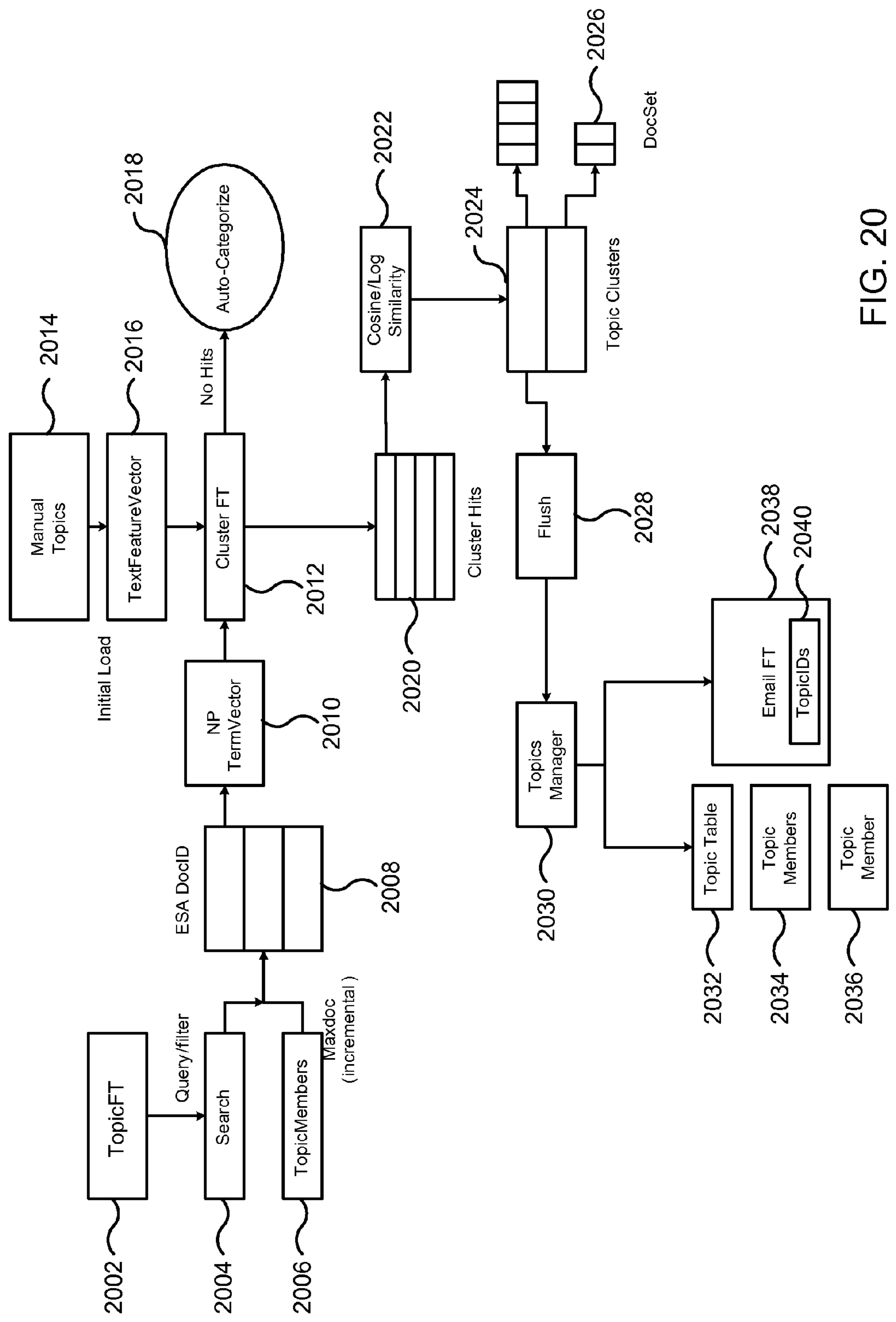
FIG. 20 is a block diagram illustrating manual topic classification in one embodiment according to the present invention.

FIG. 20 is a block diagram illustrating manual topic classification in one embodiment according to the present invention. In this example, Topic Full-Text index 2002 (TopicFT) is searched using search filter 2004. Additionally, a MAXDOC from TopicMembers 2006 is applied to determine the range of e-mail documents to process. The documents from TopicFT 2002 are processed in order, based on hits.

For each ESA DocID 2008, the NP feature vector is extracted in NP TermVector 2010 (e.g., using the Lucene Field TermVector property). The extracted feature vector is then used to construct a query with all the NPs, and searched against Cluster Full-Text index 2012 (ClusterFT). Manual topics 2014 are received to generate Text Feature Vectors 2016 stored in the ClusterFT 2012.

If there are search hits 2020, the hits are processed against a similarity measure in Cosine/Log Similarity 2022. This measure is either a Cosine or Log function of the cluster's text feature vector and the e-mail document's text feature vector. If the similarity measure is greater than a specified threshold, one or more topic clusters 2024 are identified. The document is then added to the topic's document set 2026.

Upon a Flush Criterion 2028, (for example, after every 1000 documents processed), the topic document set is written to a topics table 2032 having topics members 2034 and 2036 (e.g., Topic Tables 170 of FIG. 1) through update functions within the TopicsManager 2030. After topic clusters are written out, an e-mail Full-Text index 2038 TopicIDs table 2040 is also updated. The cluster may remain in memory after the flush, in anticipation of more documents entering the Topic Clusters 2024. If manual topic classification/identification does not produce hits, the e-mail document is processed for auto-categorization.

Figure 21:
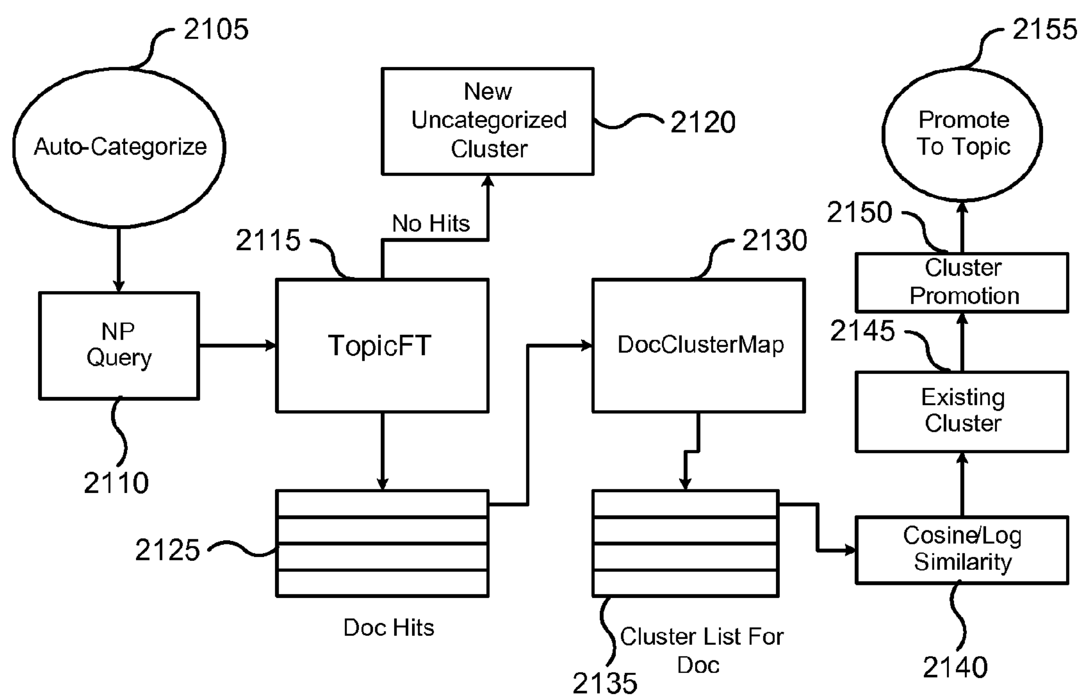
FIG. 21 is a block diagram illustrating automatic topic classification in one embodiment according to the present invention.

FIG. 21 is a block diagram illustrating automatic topic classification in one embodiment according to the present invention. In general, the first step in auto-categorization 2105 is creation of uncategorized clusters. When certain conditions are met, the uncategorized clusters are moved to promoted topics 2155. These auto-generated topics are then persisted on database tables.

In one embodiment, when a document is presented to auto-categorize 2105, a NP Query 2110 is created using NPS of the feature vector associated with the e-mail document. NP Query 2110 is then used to search TopicFT 2115 to identify document hits. For example, the NP Query 2110 searches for other noun phrase regions. If there are no hits from the Topic Full-Text index search, a new uncategorized cluster 2120 is created. In general, a new cluster is created, the document's information is added to the new cluster's set of documents, the feature vector of the new cluster is set to that of the first e-mail document, and the new cluster is added to the e-mail document's list of clusters. Note that the name of the cluster has not been created yet. In addition, since the cluster is brand new, it is not ready to be promoted to a Topic Cluster.

In this example, Doc Hits 2125 are other documents that share noun phrases similar to those found in the currently processed document. If there are hits against the Topic Full-Text index, those hits that exceed certain selection criteria are selected. A DocClusterMap 2130 is consulted to identify the list of clusters to which the document hits belong. Cluster List 2135 contains potential clusters to which this document may belong.

Membership of the document is confirmed in a cluster, by Cosine or Log similarity 2140. If the document belongs to an existing cluster 2145, the document is then added to the cluster's document set. The text feature vector of the document is also merged with the cluster's text feature vector. The top 100 NPs of the cluster are also maintained. The cluster is added to the e-mail document's cluster map. Additionally, if the document causes the cluster to become ready to be promoted, the cluster is promoted to a topic.

In general, when documents enter an uncategorized cluster, the document stays in that state until a promotion event. Cluster Promotion 2150 is triggered, for example, once every predetermined number of documents are processed. Promotion 2155 may be viewed as a guarded way to create a topic, and criteria that delays promotion is likely to result in a topic of a higher fidelity. At the same time, a delay in promotion means that the in-memory uncategorized cluster map grows larger, and new clusters also are generated unnecessarily.

Figure 22:
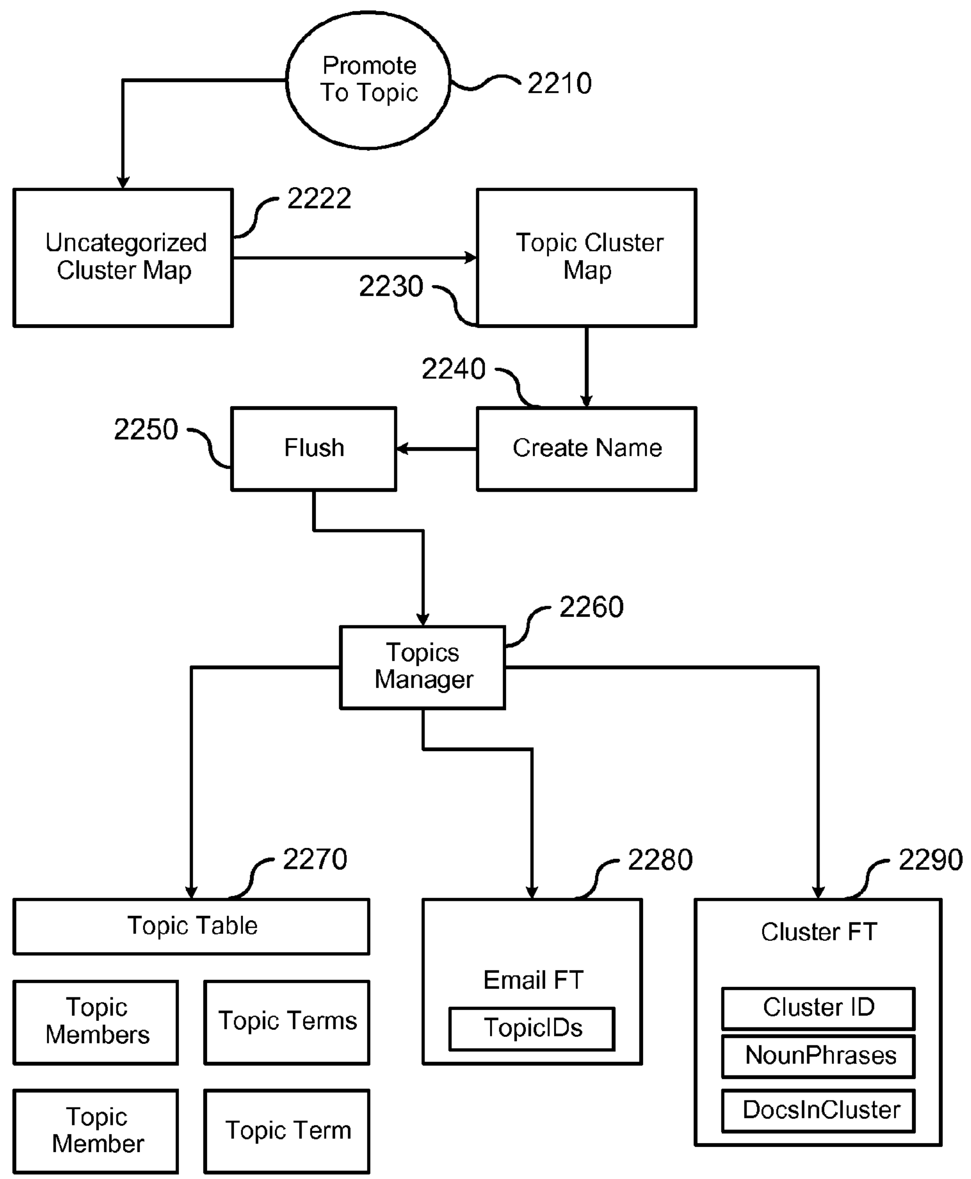
FIG. 22 is a block diagram illustrating updating a topic classification in one embodiment according to the present invention.

FIG. 22 is a block diagram illustrating updating a topic classification in one embodiment according to the present invention. In this example, when clusters are promoted during Promotion 2210, the cluster in Uncategorized Cluster Map 2222 becomes ready to be persisted in Topic Cluster Map 2230. After receiving a name in Create Name 2240, during a flush operation 2250, TopicsManager 2260 tracks those clusters that were promoted and adds the clusters to the Topic Table 2270. TopicsManager 2260 creates Topic Table 2270 entries (e.g., Topic Members and Topic Terms), with an indication of whether the topic is Auto or Manual, and Last Modified Time. Topic Members are the list of documents in the Topic Cluster. Topic Terms are the NPs for the promoted cluster.

In some embodiments, once a cluster is promoted, no new NPs are added to that topic cluster. However, the cluster continues to stay in the promoted cluster map. Any change to the cluster's document list changes the entry to a dirty-entry and the next Flush will process the dirty entries and update the Topic Members, and the E-mail Full-Text index TopicID region 2280.

Once a cluster is promoted, it stays as a promoted Topic Cluster in ClusterFT 2290. The cluster may be removed by performing a "cleanup" operation, and removing the cluster from ClusterID, removing Noun Phrases associated with the cluster, and removing the association of the cluster to one or more e-mail documents.

In some embodiments, when new e-mail documents are crawled and indexed, the second stage of auto-categorization picks up these new documents on the next scheduled classification cycle. This document addition step can occur in one of the following ways—the new documents only populate manual topic clusters, the new documents populate either a manual topic cluster or an existing auto-cluster, the new document populates an existing uncategorized auto-cluster, or the new document creates a new cluster.

Manual topic definition supports both term type topics as well as query type topics. In general, term topics are very similar to auto-topics in that the specified terms are processed into a feature vector, and a cosine dot product is computed from the manual topic definition and the feature vector of the document. Given that the feature vector of the document is based on noun phrases, this cosine similarity evaluates the distance of the document against the noun phrase specification and, if the distance is small, the document is included in the topic.

Query topics are those that are based on a pure search into the E-mail Full-Text index. In one form of query, the topic is defined as a comma or new-line separated sequence of search terms. These terms are treated as an OR query against the Subject, NewText, and QuotedText regions of E-mail FT Documents, and a Lucene MultiFieldQuery is issued. If the Hit Score is greater than a threshold, the document is included in the topic. For example, "company information, intellectual property, IP" does a Lucene BooleanOrClause query of the two phrases and the term and checks if there is a hit in Subject, NewText, and QuotedText region.

In another form of query, the topic is defined as a comma or new-line separated sequence of region and term within the region as follows: (region1 term1) (region2 term2) . . . (regionN termN). The query constructs an OR'ed query of all of them and applies a hit score threshold. For example: "(subject ken lay) (body stock sale)" collects all documents where "ken lay" is in the subject or "stock sale" is in the body.

In yet another form of query, the topic is defined as a pure Lucene Query, as per the following syntax. The "lucene:" keyword is an indicator that the rest of the text is a pure Lucene query. This is a Lucene Slop Query. Any string that is parseable may be included using Lucene's StandardTextTokenizer. For example (lucene: body:\"ken lay\"~2body:

\"stock sale) collects all documents where "ken lay" is within two words of "stock sale" within the body and puts them into a topic.

In some embodiments, a topic cleanup operation will remove all actions of auto-categorization. These are: delete all TopicTable entries" that are of type 'auto', remove the Topic Members, Topic Terms associated with topics, delete all ClusterFT entries for the topic, and delete all stored fields in EmailTopicIDs in EmailFT.

The following are some sample e-mail observations:

Subject Analysis

Sample Subject:

CALME Disclosure Schedule Information

| Text | Baseform | Phrase syntax and part-of-speech |
|---|---|---|
| CALME | Calme | premodifier, proper noun, noun phrase begins |
| Disclosure | disclosure | premodifier, noun, noun phrase continues |
| Schedule | schedule | premodifier, noun, noun phrase continues |
| Information | information | nominal head, noun, noun phrase ends, sentence boundary |

Main Body Analysis:

Body Text:

I am sending you the EOL model on Greg Piper's request. The model reflects accurately the traded volumes on EOL for 2000. Projections for 2001-2011 were built based on feedback from traders, investment bank and research institutes B2B forecasts and, common sense. These can be manipulated by changing the assumptions in the assumption sheet.

On the financial side the balance sheet and income statement have not been completely modelled since no specific deal structure has been defined. Though, they include the main revenue and expense components for EOL.

If you have any doubts with respect to the functionality of the model, please let me know. I am available to clarify them at your convenience.

Marc Eichmann

| Text | Baseform | Phrase syntax and part-of-speech |
|---|---|---|
| I | I | nominal head, pro-nominal |
| am | be | auxiliary verb, indicative present |
| sending | send | main verb, participle progressive |
| you | you | nominal head, pro-nominal |
| the | the | premodifier, determiner |
| EOL | EOL | premodifier, proper noun, noun phrase begins |
| model | model | nominal head, noun, noun phrase ends |
| on | on | preposed marker, preposition |
| Greg | Greg | premodifier, proper noun, noun phrase begins |
| Piper's | Piper | premodifier, proper noun, noun phrase continues |
| request | request | nominal head, noun, noun phrase ends |
| . | . | sentence boundary |
| The | the | premodifier, determiner |
| model | model | nominal head, noun, single-word noun phrase |
| reflects | reflect | main verb, indicative present |
| accurately | accurately | adverbial head, adverb |
| the | the | premodifier, determiner |
| traded | traded | premodifier, adjective, noun phrase begins |
| volumes | volume | nominal head, plural noun, noun phrase continues |
| on | on | postmodifier, preposition, noun phrase continues |
| EOL | EOL | nominal head, proper noun, noun phrase ends |
| for | for | postmodifier, preposition |
| 2000 | 2000 | nominal head, numeral |

-continued

| Text | Baseform | Phrase syntax and part-of-speech |
|---|---|---|
| . | . | sentence boundary |
| Projections | projection | nominal head, plural noun, single-word noun phrase |
| for | for | postmodifier, preposition |
| 2001 | 2001 | nominal head, numeral |
| — | — | |
| 2011 | 2011 | nominal head, numeral |
| were | be | auxiliary verb, indicative past |
| built | build | main verb, participle perfect |
| based | base | main verb, participle perfect |
| on | on | preposed marker, preposition |
| feedback | feed back | nominal head, noun, noun phrase begins |
| from | from | postmodifier, preposition, noun phrase continues |
| traders | trader | nominal head, plural noun, noun phrase ends |
| , | , | |
| investment | investment | premodifier, noun, noun phrase begins |
| bank | bank | nominal head, noun, noun phrase ends |
| and | and | coordination marker |
| research | research | premodifier, noun, noun phrase begins |
| institutes | institute | premodifier, plural noun, noun phrase continues |
| B2B | b2b | premodifier, noun, noun phrase continues |
| forecasts | forecast | nominal head, plural noun, noun phrase ends |
| and | and | coordination marker |
| , | , | |
| common | common | premodifier, adjective, noun phrase begins |
| sense | sense | nominal head, noun, noun phrase ends |
| . | . | sentence boundary |
| These | this | nominal head, pro-nominal |
| can | can | auxiliary verb, indicative present |
| be | be | auxiliary verb, infinitive |
| manipulated | manipulate | main verb, participle perfect |
| by | by | preposed marker, preposition |
| changing | change | main verb, participle progressive |
| the | the | premodifier, determiner |
| assumptions | assumption | nominal head, plural noun, single-word noun phrase |
| in | in | preposed marker, preposition |
| the | the | premodifier, determiner |
| assumption | assumption | premodifier, noun, noun phrase begins |
| sheet | sheet | nominal head, noun, noun phrase ends |
| . | . | sentence boundary |
| On | on | preposed marker, preposition |
| the | the | premodifier, determiner |
| financial | financial | nominal head, adjective |
| side | side | main verb, indicative present |
| the | the | premodifier, determiner |
| balance | balance | premodifier, noun, noun phrase begins |
| sheet | sheet | nominal head, noun, noun phrase ends |
| and | and | coordination marker |
| income | income | premodifier, noun, noun phrase begins |
| statement | statement | nominal head, noun, noun phrase ends |
| have | have | auxiliary verb, indicative present |
| not | not | adverbial head, adverb |
| been | be | auxiliary verb, participle perfect |
| completely | completely | adverbial head, adverb |
| modelled | model | main verb, participle perfect |
| since | since | preposed marker, clause marker |
| | since | preposed marker, preposition |
| no | no | premodifier, pro-nominal |
| specific | specific | premodifier, adjective, noun phrase begins |
| deal | deal | premodifier, noun, noun phrase continues |
| structure | structure | nominal head, noun, noun phrase ends |
| has | have | auxiliary verb, indicative present |
| been | be | auxiliary verb, participle perfect |
| defined | define | main verb, participle perfect |
| . | . | sentence boundary |
| Though | though | adverbial head, adverb |
| , | , | |
| they | they | nominal head, pro-nominal |
| include | include | main verb, indicative present |
| the | the | premodifier, determiner |
| main | main | premodifier, adjective, noun phrase begins |
| revenue | revenue | nominal head, noun, noun phrase ends |
| and | and | coordination marker |
| expense | expense | premodifier, noun, noun phrase begins |
| components | component | nominal head, plural noun, noun phrase |

-continued

| Text | Baseform | Phrase syntax and part-of-speech |
|---|---|---|
| | | continues |
| for | for | postmodifier, preposition, noun phrase continues |
| EOL | EOL | nominal head, proper noun, noun phrase ends |
| . | . | sentence boundary |

In this example, there are 12 candidate noun phrases, all with possible topics. However, all noun phrases that have some matches with the Subject Line have a better chance of being more accurate representatives of the topics in question. The target topics for this e-mail would be:

EOL Model
Balance sheet and income statement
B2B forecasts.
Revenue and Expense components
Trade Volumes for <year>
Projections for <year>

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for processing e-mails, the method comprising:

receiving, at one or more computer systems, a plurality of e-mails obtained from an e-mail repository;

storing information representing each e-mail in the plurality of e-mails in a storage device associated with the one or more computer systems, stored information representing a given e-mail including at least one of content of the given e-mail and message attribute data of the given e-mail;

for each e-mail in the plurality of e-mails, determining, with one or more processors associated with the one or more computer systems, a set of noun phrases included in the e-mail based on stored information representing the e-mail, and generating, with the one or more processors associated with the one or more computer systems, a feature representation for the e-mail based on the determined set of noun phrases included in the e-mail, a feature representation for a given e-mail scoring selected noun phrases in a set of noun phrases determined to be included in the given e-mail;

generating, with the one or more processors associated with the one or more computer systems, a set of topics based on the feature representation generated for each e-mail in the plurality of emails; and storing each topic in the set of topics in a storage device associated with the one or more computer systems in association with at least some of the plurality of e-mails.

2. The method of claim 1 wherein determining the set of noun phrases included in the e-mail comprises:

determining sentence structure associated with the e-mail; and determining parts of speech associated with the e-mail, wherein the parts of speech include the set of noun phrases.

3. The method of claim 1 wherein generating the set of topics based on the feature representation generated for each e-mail in the plurality of e-mails comprises:

determining a centroid associated with a cluster of feature representations generated for one or more e-mails in the plurality of e-mails; and generating a topic based on the centroid, the generated topic represented by a predetermined number of noun phrases common to the feature representations generated for the one or more e-mails.

4. The method of claim 1 further comprising:

determining a name associated with a topic in the set of topic in the set of topics based on the feature representation of one or more e-mails in the plurality of e-mails; and associating the name with the topic.

5. The method of claim 1 further comprising:

identifying a topic in the set of topics as relevant to one or more search terms;

identifying one or more e-mails in the plurality of e-mails that are associated with the identified topic; and generating information configured for displaying the identified one or more e-mails together with the one or more search terms.

6. The method of claim 1 further comprising:

ranking each topic in the set of topics; and generating information configured for displaying selected topics in the set of topics according to the rank of the selected topics.

7. The method of claim 1 further comprising:

determining a hierarchy between a first topic in the set of topics and a second topic in the set of topics; and generating information configured for displaying selected e-mails in the plurality of emails that are associated with the first topic based on the hierarchy between the first topic and the second topic.

8. A non-transitory computer-readable medium storing a set of code modules which when executed by a processor of a computer system cause the processor to process e-mails, the computer-readable medium comprising:

code for receiving a plurality of e-mails obtained from an e-mail repository;

code for storing information representing each e-mail in the plurality of e-mails, stored information representing a given e-mail including at least one of content of the given e-mail and message attribute data of the given e-mail;

code for determining, for each e-mail in the plurality of e-mails, a set of noun phrases included in an e-mail based on the stored information representing the e-mail;

code for generating, for each e-mail in the plurality of e-mails, a feature representation for an e-mail based on a determined set of noun phrases associated with included in the e-mail, a feature representation for a given e-mail scoring selected noun phrases in a determined set of noun phrases included in the given e-mail;

code for generating a set of topics based on a feature representation generated for each e-mail in the plurality of e-mails; and code for storing each topic in the set of topics in association with at least some of the plurality of e-mails.

9. The computer-readable medium of claim 8 wherein the code for generating, for each e-mail in the plurality of e-mails, a feature representation for an e-mail based on a determined set of noun phrases included in the e-mail comprises:

code for determining sentence structure associated with the e-mail; and code for determining parts of speech associated with the e-mail, wherein the parts of speech include the set of noun phrases.

10. The computer-readable medium of claim 8 wherein the code for generating the set of topics based on a feature representation generated for each e-mail in the plurality of e-mails comprises:

code for determining a centroid associated with a cluster of feature representations generated for one or more e-mails in the plurality of e-mails; and code for generating a topic in the set of topics based on the centroid, the generated topic represented by a predetermined number of noun phrases common to the feature representations generated for the one or more e-mails.

11. The computer-readable medium of claim 8 further comprising:

code for determining a name associated with a topic in the set of topics based on the feature representation of one or more e-mails in the plurality of e-mails; and code for associating the name with the topic.

12. The computer-readable medium of claim 8 further comprising:

code for identifying a topic in the set of topics as relevant to one or more search terms;

code for identifying one or more e-mails in the plurality of e-mails that are associated with the identified topic; and code for displaying the identified one or more e-mails in response to the one or more search terms.

13. The computer-readable medium of claim 8 further comprising:

code for ranking each topic in the set of topics; and code for displaying selected topics in the set of topics according to the rank of the selected topics.

14. The computer-readable medium of claim 8 further comprising:

code for determining a hierarchy between a first topic in the set of topics and a second topic in the set of topics; and code for displaying selected e-mails in the plurality of emails that are associated with the first topic based on the hierarchy between the first topic and the second topic.

15. A system for processing e-mails, the system comprising:

a processor; and a memory coupled to the processor, the memory configured to store a set of instructions which when executed by the processor configure the processor to:

receive a plurality of e-mails obtained from an e-mail repository;

store information representing each e-mail in the plurality of e-mails, stored information representing a given e-mail including at least one of content of the given e-mail and message attribute data of the given e-mail;

for each e-mail in the plurality of e-mails, determine a set of noun phrases included in the e-mail based on stored information representing the e-mail, and generate a feature representation for the e-mail based on the determined set of noun phrases included in the e-mail, a feature representation for a given e-mail scoring selected noun phrases in a set of noun phrases determined to be included in the given e-mail;

generate a set of topics based on the feature representation generated for each e-mail in the plurality of e-mails; and store each topic in the set of topics in association with at least some of the plurality of e-mails.

16. The system of claim 15 wherein, to determine the set of noun phrases included in the e-mail based on the stored information representing the e-mail, the processor is configured to:

determine sentence structure associated with the e-mail; and determine parts of speech associated with the e-mail, wherein the parts of speech include the set of noun phrases.

17. The system of claim 15 wherein, to generate the set of topics based on the feature representation generated for each e-mail in the plurality of e-mails, the processor is configured to:

determine a centroid associated with a cluster of feature representations generated for one or more e-mails in the plurality of e-mails; and determine a topic based on the centroid, the generated topic represented by a predetermined number of noun phrases common to the feature representations generated for the one or more e-mails.

18. The system of claim 15 wherein the processor is further configured to:

determine a name associated with a topic in the set of topics based on the feature representation of one or more e-mails in the plurality of e-mails; and associate the name with the topic.

19. The system of claim 15 wherein the processor is further configured to:

identify a topic in the set of topics as relevant to one or more search terms; and identify one or more e-mails in the plurality of e-mails that are associated with the identified topic.

20. The system of claim 15 wherein the processor is further configured to:

rank each topic in the set of topics; and generating information configured for displaying selected topics in the set of topics according to the rank of the selected topics.

21. The system of claim 15 wherein the processor is further configured to:

determine a hierarchy between a first topic in the set of topics and a second topic in the set of topics; and generating information configured for displaying selected e-mails in the plurality of emails that are associated with the first topic based on the hierarchy between the first topic and the second topic.

* * * * *